(12) United States Patent
Goebel et al.

(10) Patent No.: US 7,972,741 B2
(45) Date of Patent: Jul. 5, 2011

(54) DIFFUSION MEDIA FOR SEAL SUPPORT FOR IMPROVED FUEL CELL DESIGN

(75) Inventors: Steven G. Goebel, Victor, NY (US); Matthew J. Beutel, Webster, NY (US); Jeffrey A. Rock, Fairport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1443 days.

(21) Appl. No.: 11/439,359

(22) Filed: May 23, 2006

(65) Prior Publication Data

US 2007/0275288 A1 Nov. 29, 2007

(51) Int. Cl.
*H01M 8/24* (2006.01)
*H01M 2/40* (2006.01)
*H01M 2/08* (2006.01)

(52) U.S. Cl. ........ 429/460; 429/452; 429/457; 429/463; 429/471

(58) Field of Classification Search .................. 429/452, 429/457, 460, 463, 471
See application file for complete search history.

(56) References Cited

U.S. PATENT DOCUMENTS

| | | | |
|---|---|---|---|
| 6,017,648 A | 1/2000 | Jones | |
| 6,399,234 B2 | 6/2002 | Bonk et al. | |
| 6,610,435 B1 | 8/2003 | Maruyama et al. | |
| 6,790,552 B2 * | 9/2004 | Kobayashi et al. | 429/30 |
| 6,815,115 B2 | 11/2004 | Sugita et al. | |
| 7,087,339 B2 * | 8/2006 | Wald et al. | 429/36 |
| 2003/0087142 A1 | 5/2003 | Kobayashi | |
| 2010/0003564 A1 | 1/2010 | Tanaka | |

* cited by examiner

*Primary Examiner* — Karie O'Neill Apicella
(74) *Attorney, Agent, or Firm* — John A. Miller; Miller IP Group, PLC

(57) ABSTRACT

A fuel cell stack that includes straight cathode flow channels and straight anode flow channels through a seal area between bipolar plates in the stack. The fuel cell stack includes a seal that extends around the active area of the stack and between the stack headers and the active area. At the locations where the cathode flow channels extend through a seal area to the cathode input header and the cathode outlet header, and the anode flow channels extend through a seal area to the anode input header and the anode output header, the diffusion media layer on one side of the membrane is extended to provide the seal load. Alternately, shims can be used to carry the seal load.

24 Claims, 15 Drawing Sheets

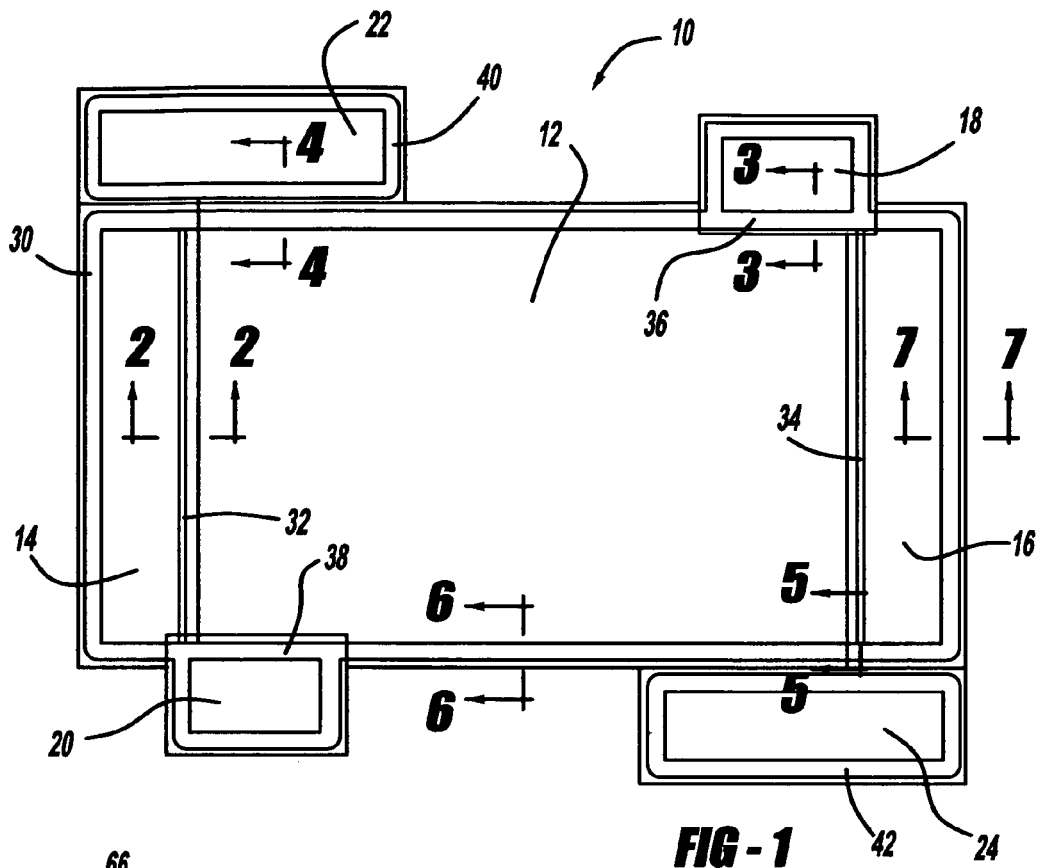
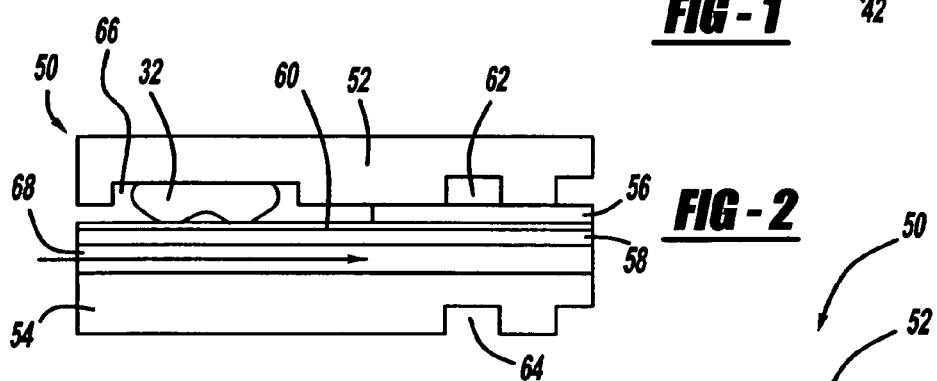
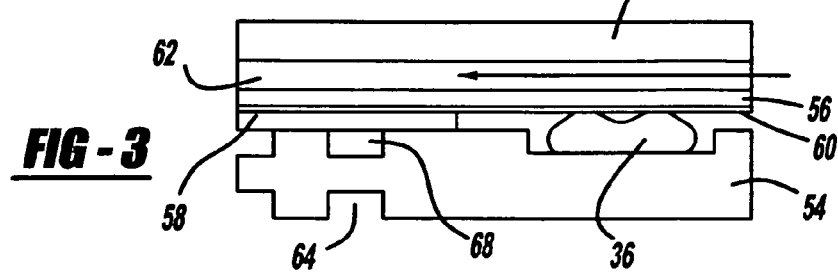

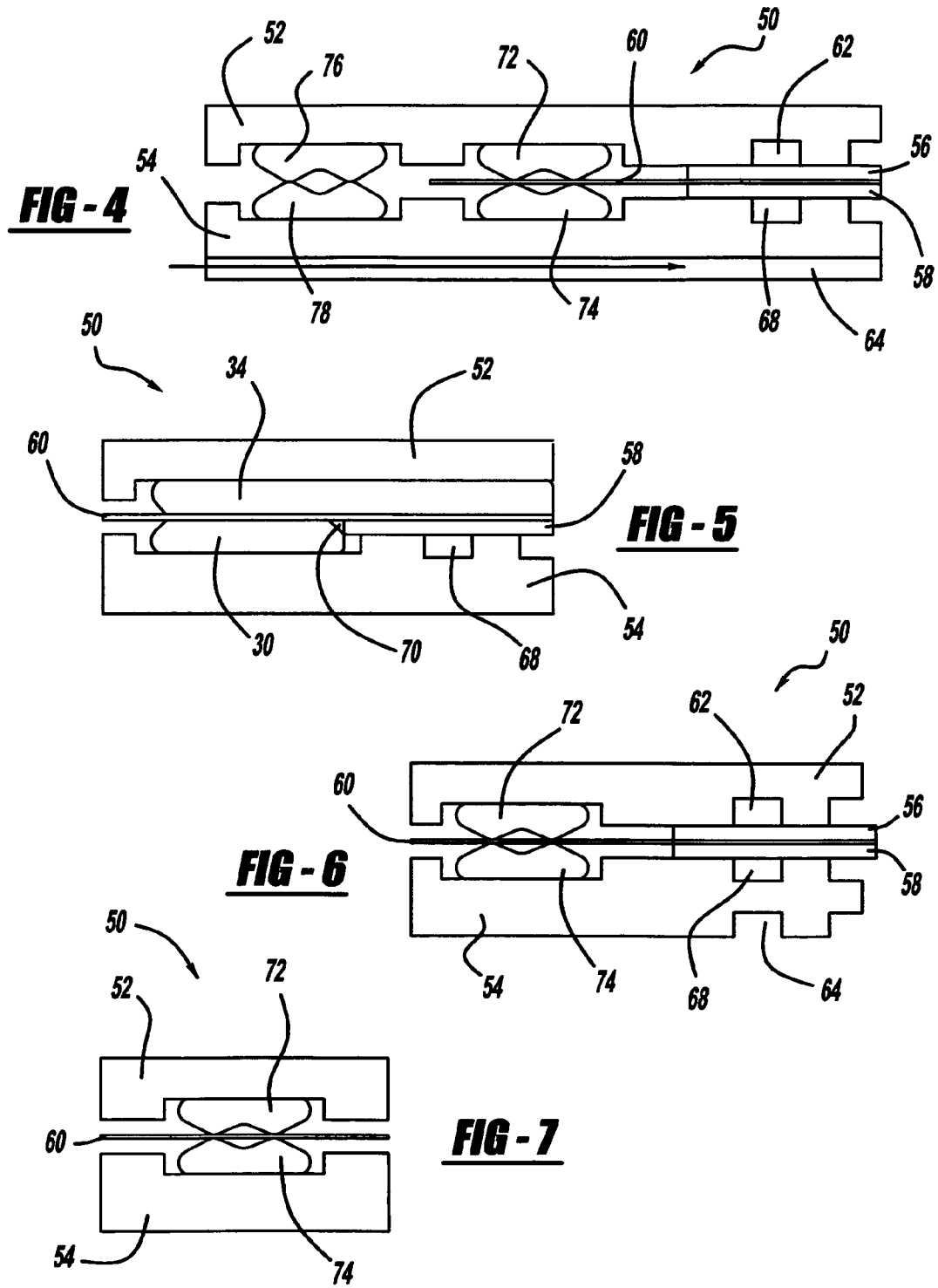

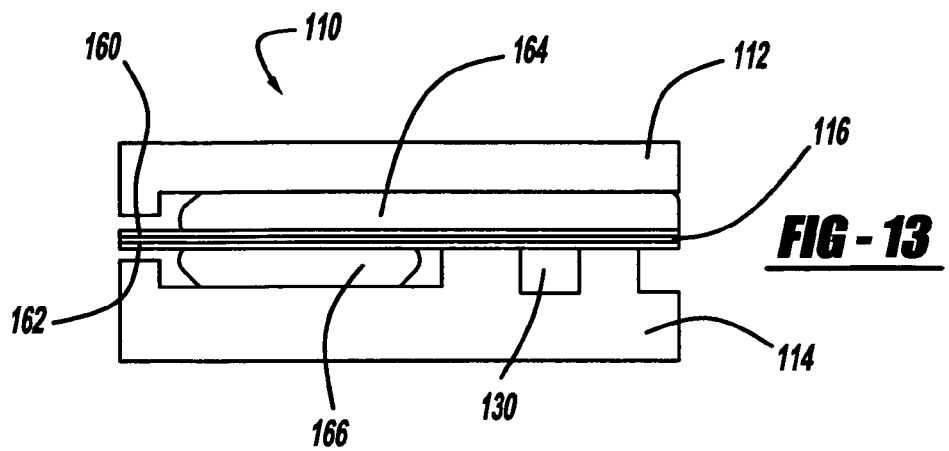
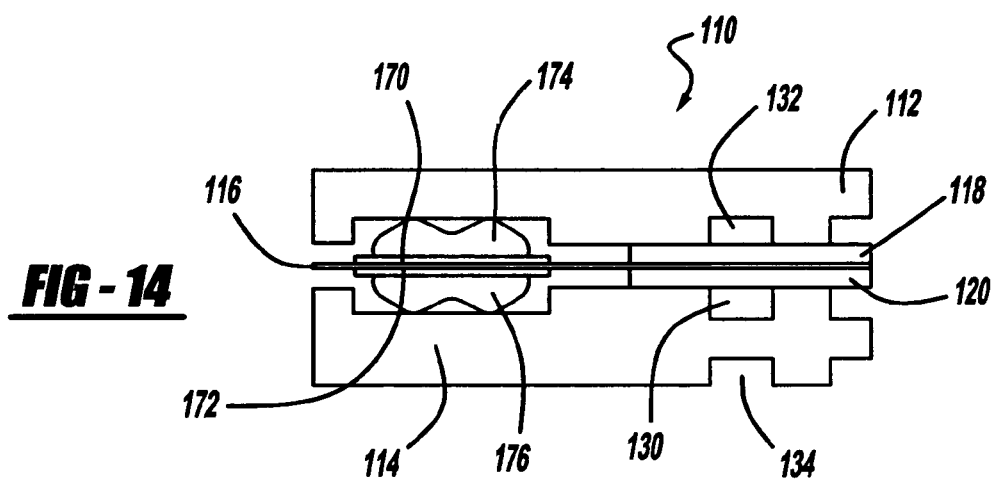
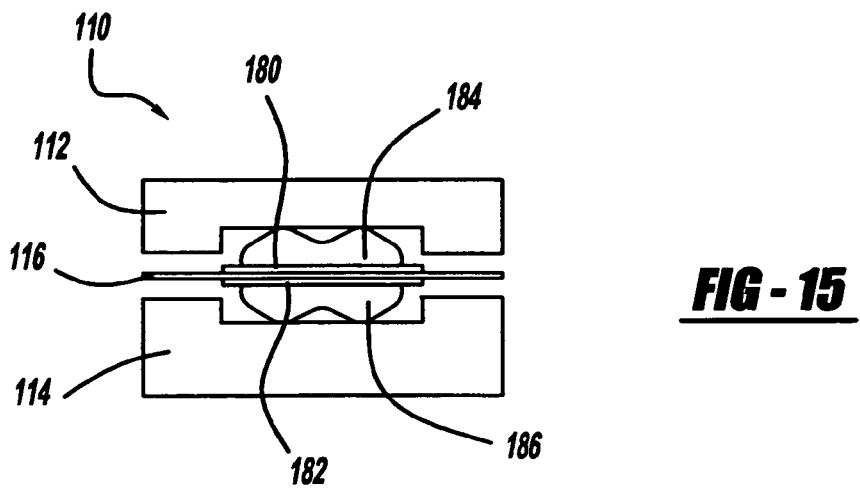

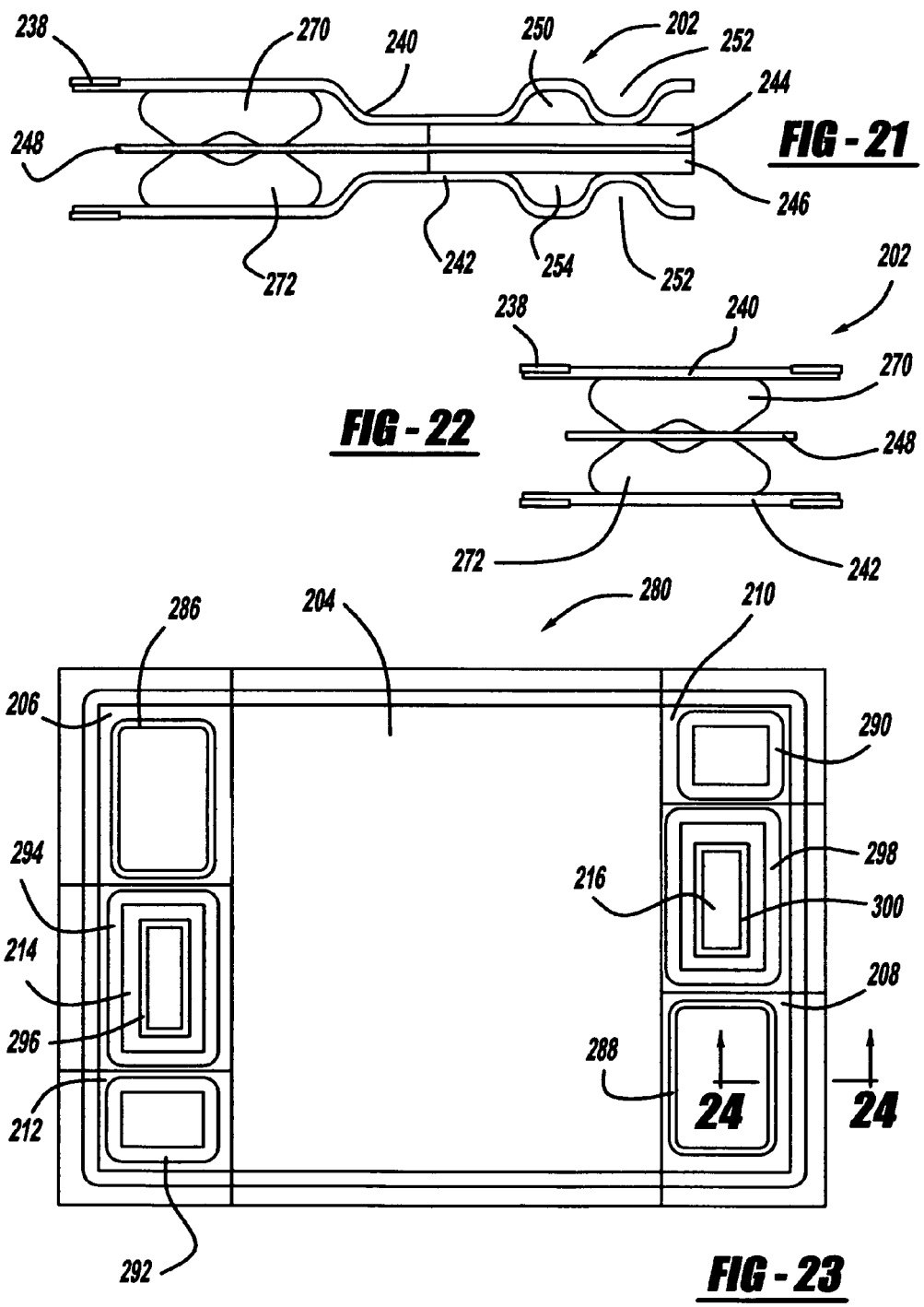

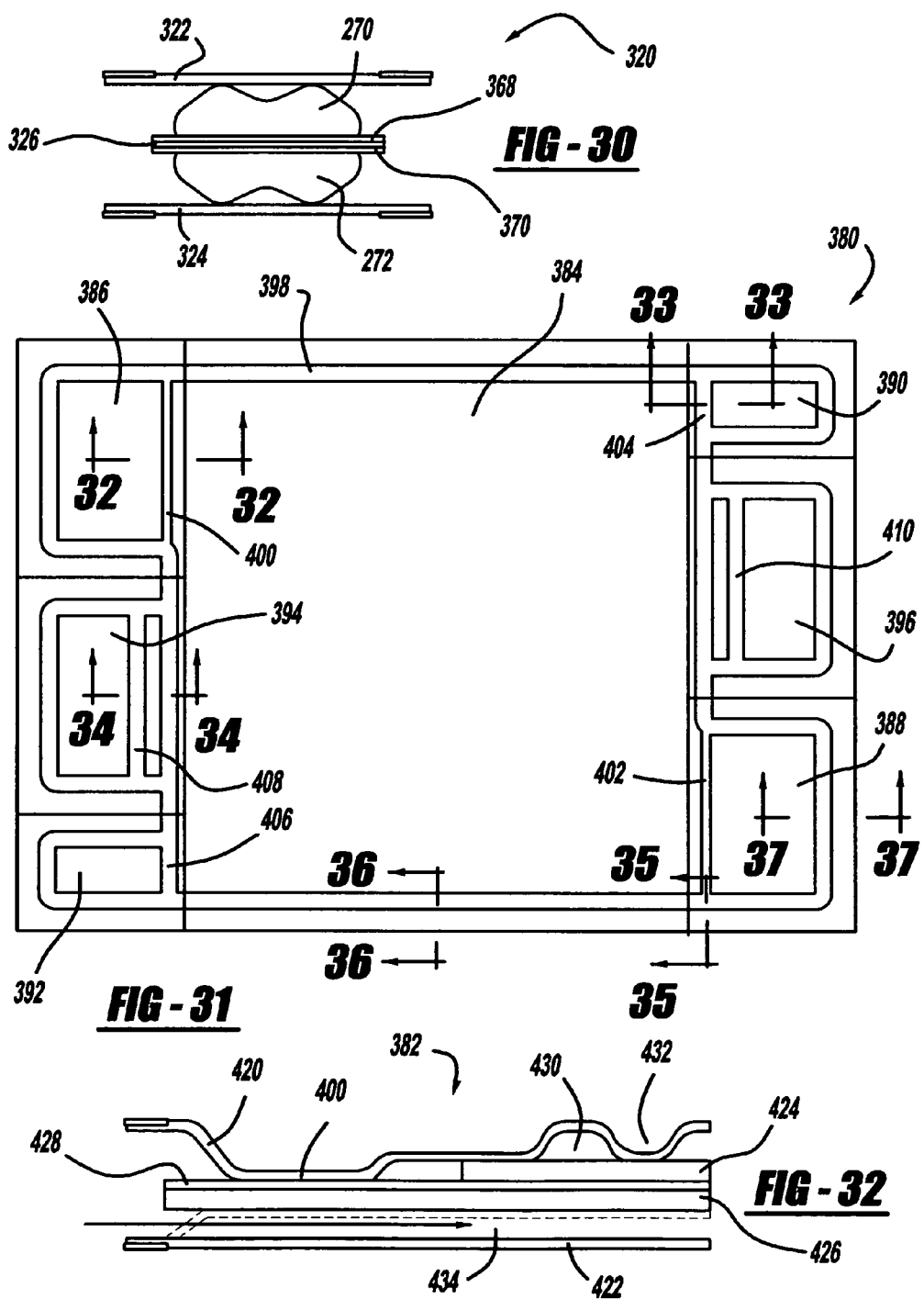

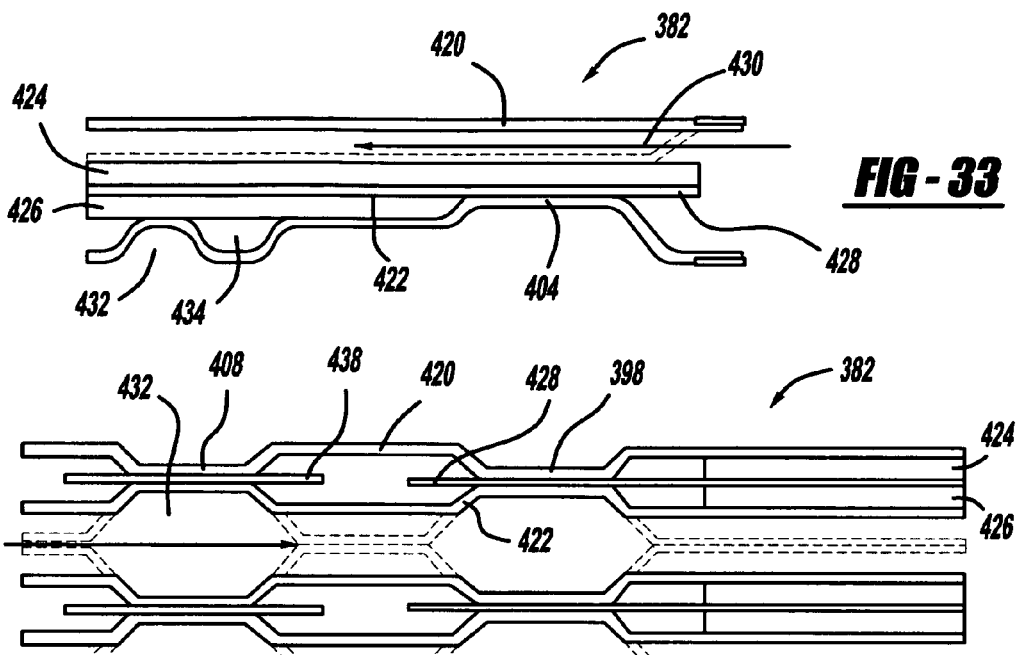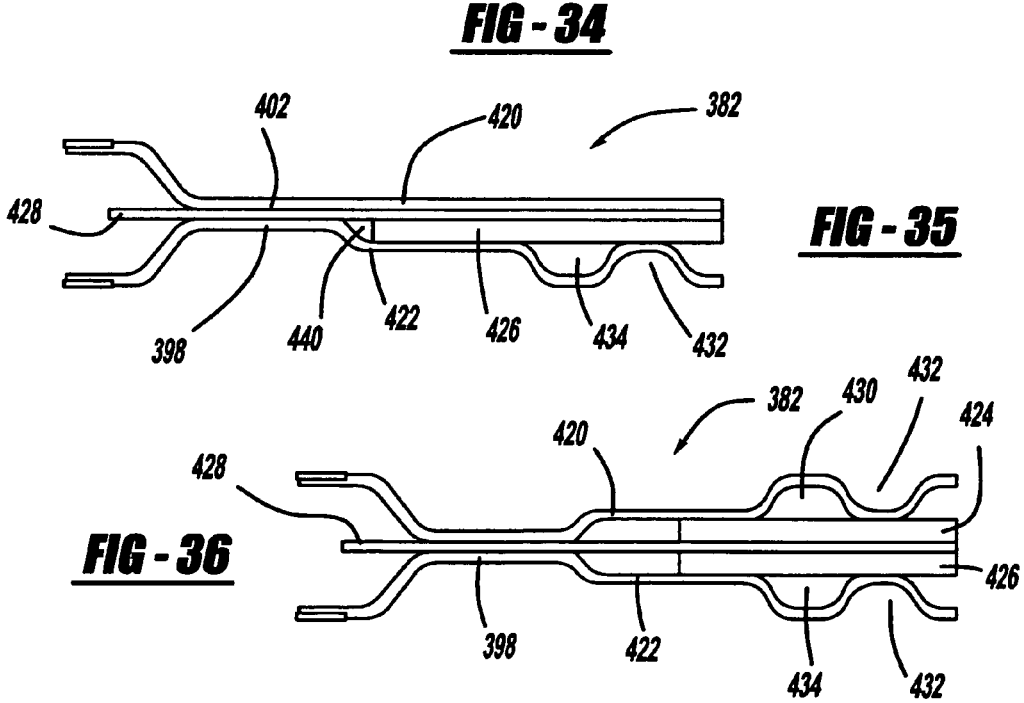

DIFFUSION MEDIA FOR SEAL SUPPORT FOR IMPROVED FUEL CELL DESIGN

BACKGROUND OF THE INVENTION

1. Field of the Invention

This invention relates generally to a fuel cell stack and, more particularly, to a fuel cell stack that includes straight cathode and anode flow channels through a seal area of the fuel cells in the stack so as to reduce water accumulation in the flow channels.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Various techniques are known in the art for fabricating the bipolar plates. In one design, the bipolar plates are made of a composite material, such as graphite, where two plate halves are separately molded and then glued together so that anode flow channels are provided at one side of one of the plate halves, cathode flow channels are provided at an opposite side of the other plate half and cooling fluid flow channels are provided between the plate halves. In another design, two separate plate halves are stamped and then welded together so that anode flow channels are provided at one side of one of the plate halves, cathode flow channels are provided at an opposite side of the other plate half and cooling fluid flow channels are provided between the plate halves.

As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below $0.2\ A/cm^2$, the water may accumulate within the flow channels because the flow rate of the reactant gas is too low to force the water out of the channels. As the water accumulates, it forms droplets that continue to expand because of the relatively hydrophobic nature of the plate material. The droplets form in the flow channels substantially perpendicular to the flow of the reactant gas. As the size of the droplets increases, the flow channel is closed off, and the reactant gas is diverted to other flow channels because the channels are in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

A fuel cell stack typically includes a seal that extends around the active area of the stack and between the stack headers and the active area for each fuel cell to prevent gas leakage from the stack. Therefore, in order to get the cathode flow, the anode flow and the cooling fluid flow from the respective inlet header into the active area of the fuel cell, it is necessary for the flow channels to go through the seal area without affecting seal integrity. Typically holes are provided through the bipolar plate around the seals, which requires a bend in the flow channels so that they line up with the flow channels in the active area. This bend in the cathode and anode flow channels provided an area that water could accumulate and be trapped which had a tendency to close the flow channel and reduce the flow of reactant gas thereto. Therefore, a better technique for traversing the seal area of the fuel cell stack is needed.

SUMMARY OF THE INVENTION

In accordance with the teachings of the present invention, a fuel cell stack is disclosed that includes straight cathode flow channels and anode flow channels through a seal area between bipolar plates in the stack. The fuel cell stack includes a seal that extends around the active area of the fuel cells in the stack and between the stack headers and the active area. At the locations where the cathode flow channels extend through the seal area to the cathode inlet header and the cathode outlet header, and the anode flow channels extend through the seal area to the anode inlet header and the anode outlet header, the diffusion media layer on one side of the membrane is extended to provide the seal load.

Additional features of the present invention will become apparent from the following description and appended claims, taken in conjunction with the accompanying drawings.

BRIEF DESCRIPTION OF THE DRAWINGS

FIG. 1 is a cross-sectional view of a fuel cell stack including composite bipolar plates, according to an embodiment of the present invention;

FIG. 2 is a cross-sectional view through line 2-2 of the fuel cell stack shown in FIG. 1;

FIG. 3 is a cross-sectional view through line 3-3 of the fuel cell stack shown in FIG. 1;

FIG. 4 is a cross-section view through line 4-4 of the fuel cell stack shown in FIG. 1;

FIG. 5 is a cross-sectional view through line 5-5 of the fuel cell stack shown in FIG. 1;

FIG. 6 is a cross-sectional view through line 6-6 of the fuel cell stack shown in FIG. 1;

FIG. 7 is a cross-sectional view through line 7-7 of the fuel cell stack shown in FIG. 1;

FIG. 13 is a cross-sectional view through line 5-5 of the fuel cell stack shown in FIG. 1 that includes composite bipolar plates and shims;

FIG. 14 is a cross-sectional view through line 6-6 of the fuel cell stack shown in FIG. 1 that includes composite bipolar plates and shims;

FIG. 15 is a cross-sectional view through line 7-7 of the fuel cell stack shown in FIG. 1 that includes composite bipolar plates and shims;

FIG. 21 is a cross-sectional view through line 21-21 of the fuel cell stack shown in FIG. 16;

FIG. 22 is a cross-sectional view through line 22-22 of the fuel cell stack shown in FIG. 16;

FIG. 23 is a cross-sectional view of a fuel cell stack including stamped bipolar plates and header seal loops, according to another embodiment of the present invention;

FIG. 30 is a cross sectional view through line 22-22 of the fuel cell stack shown in FIG. 16, where the stack includes stamped bipolar plates and shims;

FIG. 31 is a cross-sectional view of a fuel cell stack including stamped bipolar plates, where the bipolar plates provide the seal for the stack, according to another embodiment of the present invention;

FIG. 32 is a cross-sectional through line 32-32 of the fuel cell stack shown in FIG. 31;

FIG. 33 is a cross-sectional view through line 33-33 of the fuel cell stack shown in FIG. 31;

FIG. 34 is a cross-sectional view through line 34-34 of the fuel cell stack shown in FIG. 31;

FIG. 35 is a cross-sectional view through line 35-35 of the fuel stack shown in FIG. 31;

FIG. 36 is a cross-sectional view through line 36-36 of the fuel cell stack shown in FIG. 31;

DETAILED DESCRIPTION OF THE EMBODIMENTS

Figure 8:
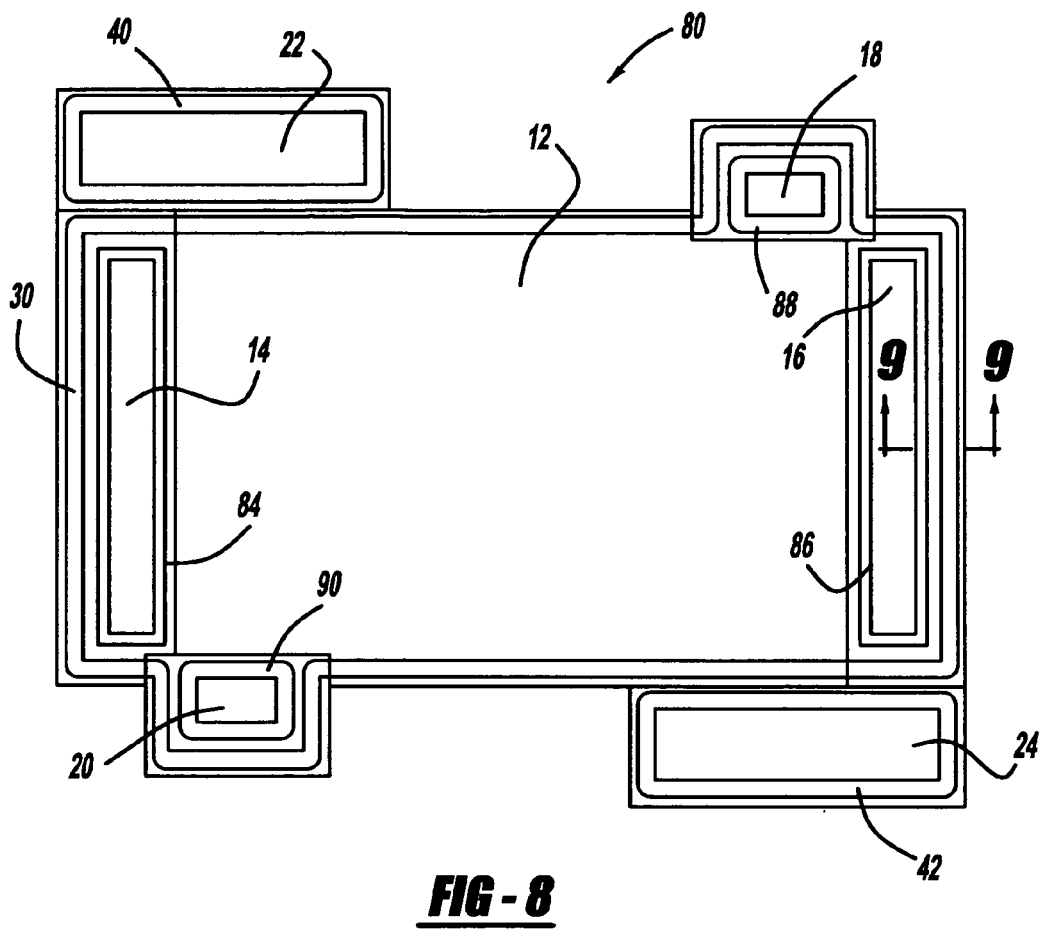
FIG. 8 is a cross-sectional view of a fuel cell stack including composite bipolar plates and header seal loops, according to another embodiment of the present invention.

The following discussion of the embodiments of the invention directed to a fuel cell stack including straight reactant gas flow channels through a seal area is merely exemplary in nature, and is in no way intended to limit the invention or applications or uses.

FIG. 1 is a cross-sectional view through a fuel cell 50 of a fuel cell stack 10, where the stack 10 includes an active area 12 and composite bipolar plates. The stack 10 includes a cathode inlet header 14 that receives a cathode reactant gas flow and a cathode outlet header 16 that receives a cathode outlet gas flow, where the cathode gas flows through flow channels in the active area 12. The stack 10 also includes an anode inlet header 18 that receives an anode reactant gas flow and an anode outlet header 20 that receives an anode exhaust gas flow, where anode flow channels extend through the active area 12. The stack 10 also includes a cooling fluid inlet header 22 that receives a cooling fluid and a cooling fluid outlet header 24 that outputs the cooling fluid from the stack 10, where the cooling fluid flows through cooling fluid channels through the active area 12, as is well understood in the art.

In order to contain and separate the reactant gas flows and the cooling fluid flow, various seals are provided between the bipolar plates in the stack 10. Particularly, a seal 30 is provided around the perimeter of the fuel cell 50, a seal 32 is provided between the cathode inlet header 14 and the active area 12, a seal 34 is provided between the cathode outlet header 16 and the active area 12, a seal 36 is provided between the anode inlet header 18 and the active area 12, a seal 38 is provided between the anode outlet header 20 and the active area 12, a seal loop 40 is provided around the cooling fluid inlet header 22, and a seal loop 42 is provided around the cooling fluid outlet header 24. The seals can be made of any suitable elastomeric or resilient material.

FIG. 2 is a cross-sectional view through line 2-2 of the fuel cell 50. The fuel cell 50 includes an anode side composite bipolar plate 52 and a cathode side composite bipolar plate 54. The bipolar plates shown in the figures are bipolar plate halves in that the bipolar plate half for the adjacent fuel cell is not shown. The fuel cell 50 also includes an anode side diffusion media layer 56, a cathode side diffusion media layer 58 and a membrane 60 therebetween. The anode side bipolar plate 52 includes anode flow channels 62 and the cathode side bipolar plate 54 includes part of cooling fluid flow channels 64, where the other half of the cooling fluid flow channels is provided by the other plate half.

The seal 32 is positioned in a channel 66 in the anode side bipolar plate 52. In the known fuel cell stacks that include composite bipolar plates, the seal would be thicker and the membrane 60 would follow a curved path around the seal. According to the invention, the membrane 60 extends straight through the seal area and the cathode side diffusion media layer 58 has been extended to an outer edge of the cathode side bipolar plate 54. The extended diffusion media layer 58 provides seal integrity at the cathode side of the seal area. As a result of this configuration, cathode flow channels 68 extending from the cathode inlet header 14 to the active area 12 are straight. The seal area between the cathode outlet header 16 and the active area 12 would look the same.

FIG. 3 is a cross-sectional view through line 3-3 of the fuel cell stack 10 showing the seal area between the anode inlet header 18 and the active area 12 of the fuel cell 50. According to the invention, the seal 36 is narrower and the anode side diffusion media layer 56 has been extended to an outer edge of the anode side bipolar plate 52. The extended diffusion media layer 56 provides seal integrity at the anode side of the seal area. Further, the anode flow channels 62 extending from the header 18 to the active area 12 are straight. The seal area between the anode outlet header 20 and the active area 12 would look the same.

FIG. 4 is a cross-sectional view through line 4-4 of the fuel cell stack 10 showing the seal area between the cooling fluid inlet header 22 and the active area 12. At this location, the seal 30 includes cathode and anode seal halves 72 and 74 and the seal 40 includes cathode and anode seal halves 76 and 78. Straight flow cooling fluid channels 64 are provided from the cooling fluid inlet header 22 to the active area 12 through the seal area. The cross-sectional view of the fuel cell 50 at this location would be nearly the same as some of those known in the art. The seal area between the cooling fluid outlet header 24 and the active area 12 would look the same.

FIG. 5 is a cross-sectional view through line 5-5 showing a joint sealing area between the cathode outlet header 16 and the active area 12. In the joint area, a gap 70 may be created between the diffusion media layer 58 and the seal 30 where the diffusion media layer 58 is supporting the seal on the opposite side of the membrane 60. The gap 70 itself is not a sealing issue as flow is passing through this region anyway. It may be necessary to provide a continuous surface for the seal on the opposite side of the membrane 60 to seal against. Thus, a filling material may be provided in the gap 70 to provide seal support. The filling material may be an elastometer that cures in place after the seal 30 and the diffusion media layer 58 have been positioned. If a membrane with sub-gaskets support is sufficiently stiff, it can bridge the gap 70 without loss of seal function, and a fill material may not be required. An alternative solution for dealing with the gap 70 is to nest the header seal as a complete loop within a separate and continuous perimeter loop. At this location, the diffusion media layer 58 has been extended, as discussed above.

FIG. 6 is a cross-sectional view through line 6-6 of the fuel cell stack 10 at an edge of the active area 12. At this location, the seal 30 includes the two seal halves 72 and 74. The cross-sectional view of the fuel cell 50 at this location would also be about the same as some of those known in the art.

FIG. 7 is a cross-sectional view through line 7-7 of the fuel cell stack 10 at an outer edge of the cathode outlet header 16. At this location, the seal 30 includes the two seal halves 72 and 74. The cross-sectional view of the fuel cell 50 at this location would also be about the same as some of those known in the art.

As discussed above, the diffusion media layers carry the seal load across the channels in their reactant gas inlet and outlet regions. If necessary, the diffusion media layer in the seal support region can be filled to provide additional stiffness. This allows direct channels into the active area 12 without tunnels or ports, and does not require that holes be fabricated into the plate or additional bridge inserts be provided. Eliminating the ports and tunnels in the plates will improve water management as water has been found to accumulate in these places. Further, eliminating the holes in the plates simplifies the plate fabrication. Without tunnels, only one side of the plate needs to have a hydrophilic coating applied thereto.

At those locations where both the anode and cathode seals overlap, both reactant gases are sealed. The cathode reactant gas can flow through the anode seal where there is no cathode seal, so a flow path from the cathode inlet header 14 to the cathode outlet header 16 is provided. Similarly, the anode reactant gas flow can pass the cathode seal where there is no anode seal, so a flow path from the anode inlet header 18 to the anode outlet header 20 is provided. For the solid composite plate design, the cooling fluid flow path is independently defined from the reactant flow pattern so that the cooling fluid channels 64 can pass between the seals without affecting the sealing surface on the reactant gas sides. The two plate halves would be bonded together to prevent leakage of cooling fluid from between the plate halves. For solid plates, this bond is not shown as the plate halves would typically be bonded over the entire plate-to-plate interface surface to ensure low electrical contact resistance between the two bipolar plate halves.

In certain fuel cell designs, the anode headers and the cathode headers include seal loops that extend completely around the header to increase the seal integrity. FIG. 8 is a cross-sectional view of a fuel cell stack 80 through a fuel cell 82, where like elements to the fuel cell stack 10 are identified by the same reference numeral. In this fuel cell stack design, the seal 32 at the cathode inlet header 14 is replaced with a seal loop 84, the seal 34 at the cathode outlet header 16 is replaced with a seal loop 86, the seal 36 at the anode inlet header 18 is replaced with a seal loop 88, and the seal 38 at the anode outlet header 20 is replaced with a seal loop 90.

Figure 9:
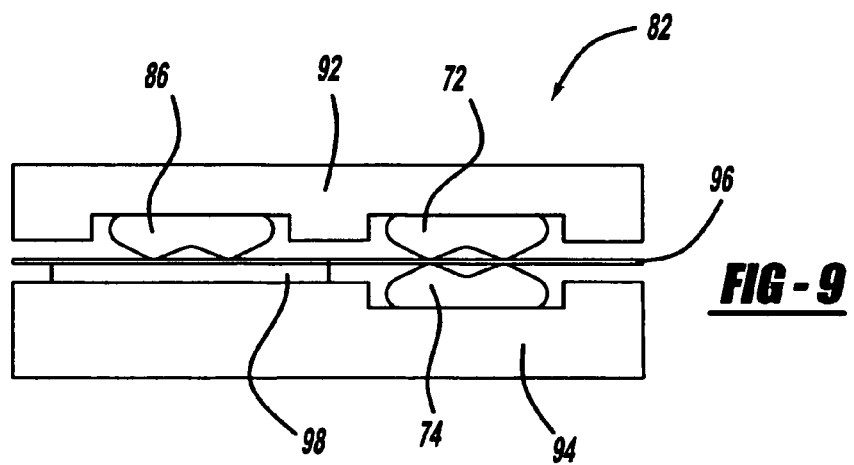
FIG. 9 is a cross-sectional view through line 9-9 of the fuel cell stack shown in FIG. 8.

The seal area between the cathode headers 14 and 16 and the active area 12, the seal area between the anode headers 18 and 20 and the active area 12 and the seal area between the cooling fluid headers and the active area 12 for the fuel cell stack 80 where the diffusion media layers 56 and 58 are extended to provide the seal integrity is the same as those seal areas in the fuel cell stack 10. However, the seal area at the outer edge of the headers 14, 16, 18 and 20 where there is an extra seal would be different. To show this, FIG. 9 is a cross-sectional view through line 9-9 of the fuel cell stack 80, according to an embodiment of the present invention. The fuel cell 82 includes an anode side bipolar plate 92, a cathode side bipolar plate 94, and a membrane 96 therebetween. Because the cathode side diffusion media layer 98 would extend to the edge of the header 16, the diffusion media layer 98 is shown extending through the seal area provided by the seal loop 86 to provide the continuous seal integrity.

It is know in the art to provide shims between the seal and the membrane at the seal area. However, it has not been known to use shims across channels to create tunnels and support seal loads. According to another embodiment of the invention, a separate shim could be used in this region in place of extending the diffusion media layer for seal support. To ensure adequate seal support, a thicker shim (about 0.1 mm) may be required that would be a larger thickness change to accommodate a seal joint. To address this, the shim could be continuous around the seal perimeter. It may be preferable that the shims and seals be bonded to the membrane. This approach could use shims on both sides, or only on one side. Thinner sub-gaskets may be used on one or both sides as required to provide the desired active area edge architecture. If only one shim were used, a sub-gasket would be desired on the opposite side of the membrane if material requirements do not allow membranes and seals to have direct contact. For the shim supported configuration with an elastomer seal, a span region may be provided. This simply means that the span created by the gasket gland should be smaller than a typical channel span (0.5-1.5 mm) as the shim must provide adequate stiffness to support across a channel span. If the seals are bonded to the shims and the membrane, the seal itself will provide additional stiffness to the sealing surface as this surface would be against the plate, and not the membrane, in this configuration. Because these are shim supported rather than diffusion media supported seals, the channels in this region may be deeper at the shim because the shim is not as thick as the diffusion media layer. The channel bottom could also rise in this region to maintain channel size.

Most membranes have a thin (25 μm) sub-gasket (plastic film) on both sides around the perimeter for mechanical strength and to avoid direct contact between the acidic ionomer membrane and the plate or seals. The use of shims for the invention could involve using a thicker sub-gasket(s) to provide adequate stiffness to span channels and support seal loads.

Figure 10:
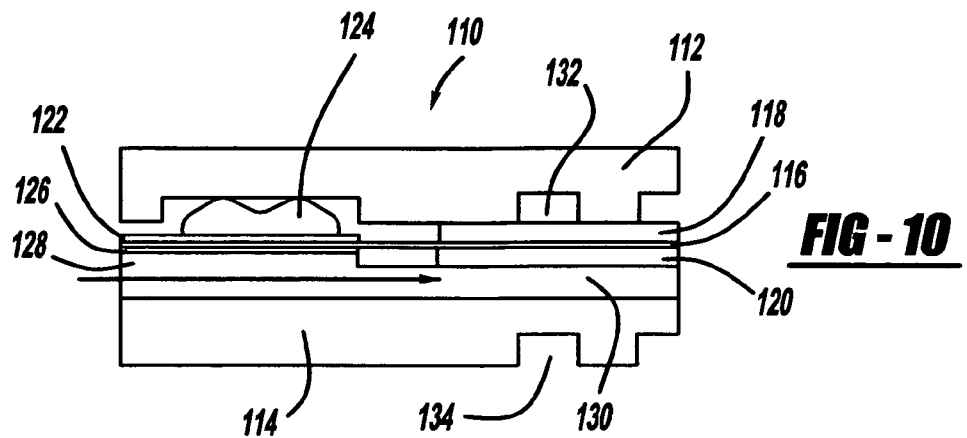
FIG. 10 is a cross-sectional view through line 2-2 of the fuel cell stack shown in FIG. 1, where the fuel cell stack includes composite bipolar plates and shims.
Figure 11:
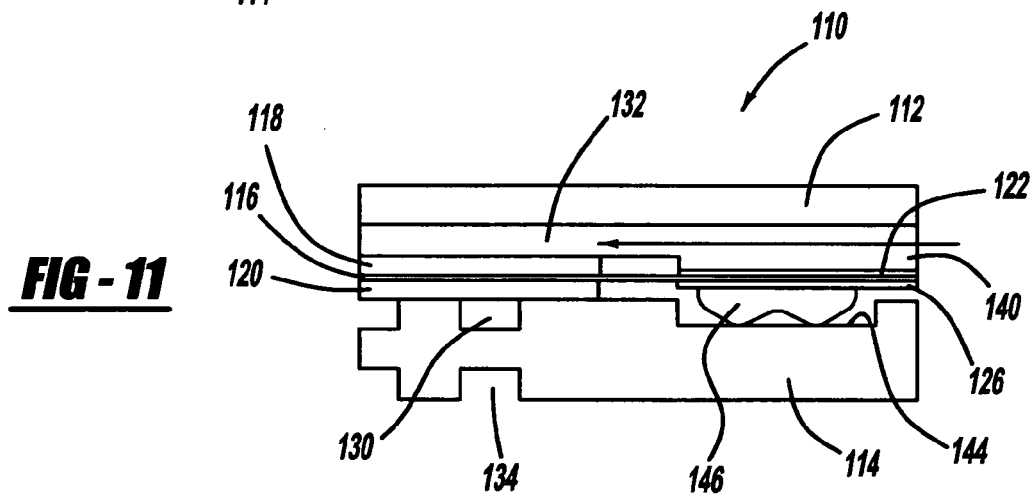
FIG. 11 is a cross-sectional view through line 3-3 of the fuel cell stack shown in FIG. 1 that includes composite bipolar plates and shims.
Figure 12:
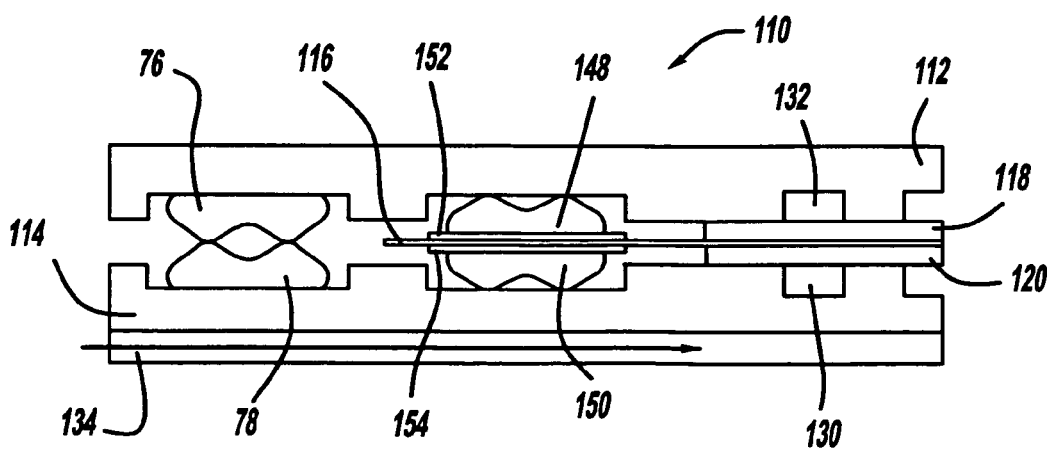
FIG. 12 is a cross-sectional view through line 4-4 of the fuel cell stack shown in FIG. 1 that includes composite bipolar plates and shims.

FIGS. 10-15 show cross-sectional views through a fuel cell 110 of a fuel cell stack that would be similar to the fuel stack 10 where the various headers are provided at the same location of the fuel cell stack and identified with the same reference numeral. FIG. 10 represents a cross-sectional view at location 2-2 of the fuel cell 110, FIG. 11 represents a cross-sectional view at location 3-3 of the fuel cell 110, FIG. 12 represents a cross-sectional view at location 4-4 of the fuel cell 110, FIG. 13 represents a cross-sectional view through location 5-5 of the fuel cell 110, FIG. 14 represents a cross-sectional view at location 6-6 of the fuel cell 110, and FIG. 15 represents a cross-sectional view of the fuel cell 110 at location 7-7.

FIG. 10 shows the seal area between the active area 12 of the fuel cell 110 and the cathode inlet header 14. The fuel cell 110 includes an anode side bipolar plate 112, a cathode side bipolar plate 114 and a membrane 116 therebetween. An anode side diffusion media layer 118 is provided between the bipolar plate 112 and the membrane 116 on the anode side and a cathode side diffusion media layer 120 is provided between the membrane 116 and the bipolar plate 114 on the cathode side. Anode flow channels 132 are provided in the anode side bipolar plate 112 and cooling fluid flow channels 134 are provided in the cathode side bipolar plate 114.

In this embodiment, a shim 122 is provided between the membrane 116 and an anode seal 124 at the seal area and a shim 126 is provided between the membrane 116 and a raised portion 128 of the cathode side bipolar plate 114. Cathode flow channels 130 extend through the raised portion 128 and provides a straight flow through the seal area to the active area 12 of the fuel cell 110. The combination of the shim 126 and the raised portion 128 maintain the seal integrity of the cathode side of the fuel cell 110 at this location.

FIG. 11 shows the seal area between the active area 12 of the fuel cell 110 and the anode inlet header 18 where the anode side bipolar plate 112 includes a raised portion 140. The combination of the raised portion 140 and the shim 122 provides the structure to maintain the seal integrity at this area so that the anode flow channels 132 have a straight flow through the seal area of anode header 18 to the active area of the fuel cell 110. The cathode side bipolar plate 114 includes a channel 144 in which a seal 146 is positioned.

FIG. 12 shows shims 152 and 154 between seal halves 148 and 150 and the membrane 116 at the cooling fluid inlet header 22. The cooling fluid flow channels 134 are shown in this cross-section.

FIG. 13 shows shims 160 and 162 between the membrane 116 and seals 164 and 166 at the joint area between the cooling fluid outlet header 24 and the cathode outlet header 14.

FIG. 14 shows shims 170 and 172 between the membrane 116 and seal halves 174 and 176 at the outer edge of the active area of the fuel cell 110.

FIG. 15 shows shims 180 and 182 between seal halves 184 and 186 and the membrane 116 at an outer edge of the cathode outlet header 16.

Figure 16:
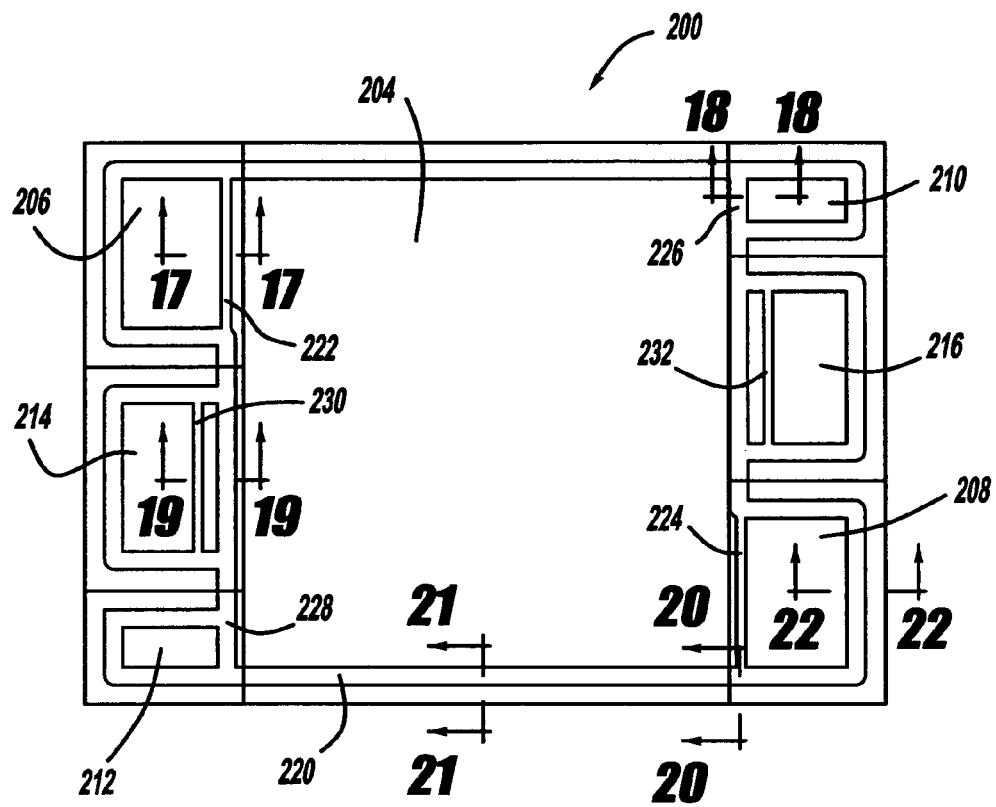
FIG. 16 is a cross-sectional view of a fuel cell stack including stamped bipolar plates, according to another embodiment of the present invention.

FIG. 16 is a cross-sectional view of a fuel cell stack 200 through a fuel cell 202 of the stack 200. In this embodiment, the fuel cell stack 200 includes stamped bipolar plates. The fuel cell stack 200 includes an active area 204, a cathode inlet header 206, a cathode outlet header 208, an anode inlet header 210, an anode outlet header 212, a cooling fluid inlet header 214, and a cooling fluid outlet header 216. In an alternate embodiment, the fuel cell stack 200 could include bonds that cross the seals, as is well understood to those skilled in the art. A seal 220 extends around an outer perimeter of the fuel cell 202. Further, a seal 222 is provided between the cathode inlet header 206 and the active area 204, a seal 224 is provided between the cathode outlet header 208 and the active area 204, a seal 226 is provided between the anode inlet header 210 and the active area 204, a seal 228 is provided between the anode outlet header 212 and the active area 204, a seal 230 is provided between the cooling fluid inlet header 214 and the active area 204, and a seal 232 is provided between the cooling fluid outlet header 216 and the active area 204.

Figure 17:
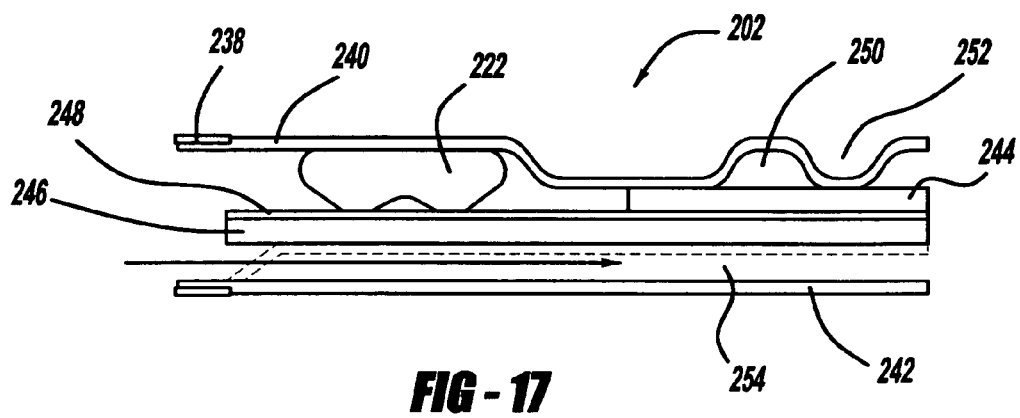
FIG. 17 is a cross-sectional view through line 17-17 of the fuel cell stack shown in FIG. 16.

FIG. 17 is a cross-sectional view through line 17-17 of the fuel cell 200. The fuel cell 200 includes an anode side stamped bipolar plate 240 and a cathode side stamped bipolar plate 242. The bipolar plates shown are bipolar plates halves in that the stamped bipolar plate for the adjacent fuel cell is not shown. The fuel cell 200 includes an anode side diffusion media layer 244, a cathode side diffusion media layer 246 and a membrane 248 therebetween. The anode side bipolar plate 240 includes anode flow channels 250 and part of cooling fluid flow channels 252, where the other half of the cooling fluid flow channels are provided by the other plate half. Plate bonds 238 are provided to bond the bipolar plates together.

The seal 222 is provided at an outer edge of the anode side of the bipolar plate 240. According to the invention, the seal 222 is thinner than the seal that would normally be present at this location so that the membrane 248 is straight through the seal area. Further, the cathode side diffusion media layer 246 has been extended to an outer edge of the cathode side bipolar plate 242 to provide seal integrity at the cathode side of the seal area. By extending the diffusion media 246 in this manner, cathode flow channels 254 can be straight through the seal area into the active region 204 to reduce areas where water can accumulate in the flow channels 254. The seal area between the cathode outlet header 208 and the active area 204 would look the same.

Figure 18:
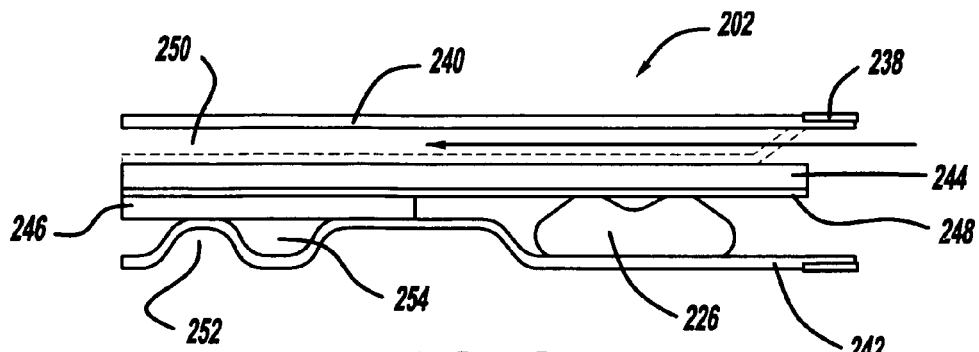
FIG. 18 is a cross-sectional view through line 18-18 of the fuel cell stack shown in FIG. 16.

FIG. 18 is a cross-sectional view through line 18-18 of the fuel cell stack 200 showing the seal area between the anode inlet header 210 and the active area 204 of the fuel cell 202. According to the invention, the seal 226 is reduced in thickness from the seal that would normally be provided at this location so that the membrane 248 extends straight through the seal area from the active region 204. Further, the anode side diffusion media layer 244 is extended through the seal area so that the anode flow channels 250 extend straight through the seal area for the purposes discussed above. The seal area between the anode outlet header 212 and the active area 204 would look the same.

Figure 19:
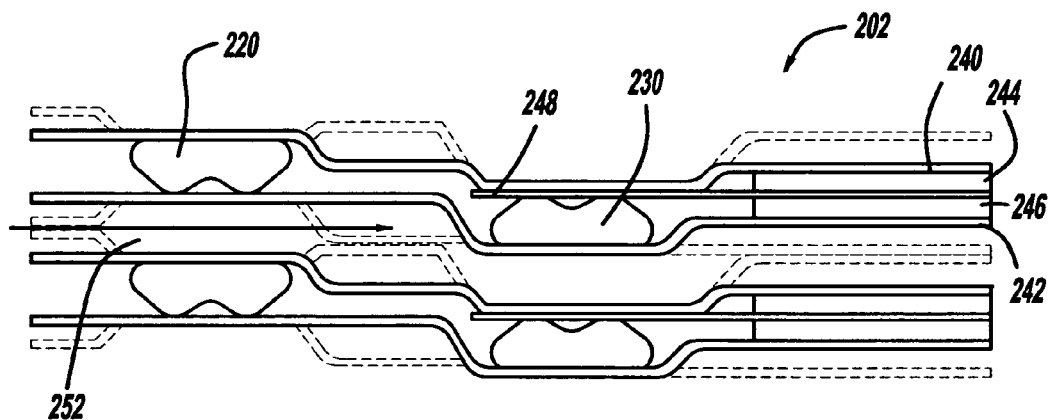
FIG. 19 is a cross-sectional view trough line 19-19 of the fuel cell stack shown in FIG. 16.

FIG. 19 is a cross-sectional view through line 19-19 of the fuel cell stack 200 showing the seal area between the cooling fluid inlet header 214 and the active area 204. According to the invention, the thickness of the seals 230 and 220 are reduced so that the membrane 248 extends straight through the seal area from the cooling fluid inlet header 214 to the active area 204. The seal area between the cooling fluid outlet header 216 and the active area 204 would look the same.

Figure 20:
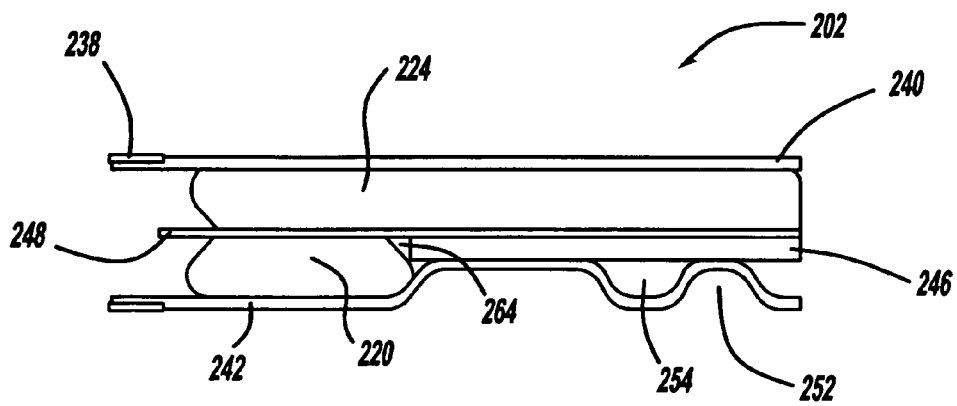
FIG. 20 is a cross-sectional view through line 20-20 of the fuel cell stack shown in FIG. 16.

FIG. 20 is a cross-sectional view through line 20-20 of the fuel cell stack 200 showing a joint sealing area between the cathode outlet header 208 and the active area 204. In this embodiment, the anode side diffusion media layer 246 has been extended to the seal 220, as shown. A gap 264 is provided between the diffusion media layer 246 and the seal 220, and can be filled with appropriate filling material. In this configuration, the membrane 248 extends straight through the seal area.

FIG. 21 is a cross-sectional view through line 21-21 of the fuel cell stack 200 at an edge section of the fuel cell 202. In this embodiment, the seal 220 includes two seal halves 270 and 272 that allow the membrane 248 to extend straight through the seal area into the active area 204.

FIG. 22 is a cross-sectional view through line 22-22 of the fuel cell stack 200 at an outer edge portion of the cathode outlet header 208. In this embodiment, the seal 220 is made of the two seal halves 270 and 272 to provide the straight membrane 248 through the seal area.

For the stamped plates, a bond is shown where the plate halves need to be sealed together to prevent cooling fluid leakages. This could be done using a welded or adhesive bond. For stamped plates with elastomer seals, an option would be for the bond lines to traverse the seal glands. To ensure adequate seal support for the stamped plates, the plate halves contact each other on either side of the seal. In the cooling fluid inlet header 214, the cooling fluid flow path is provided so that the plate halves shown by the dotted lines show this. The cooling fluid can flow through because the path is not blocked by the plates. Also for the stamped plate configuration with elastomer seals, the cathode seal is shown to be more inboard on both ends, but seal order with respect to the flow direction is not critical and may be defined based on other requirements.

In another fuel cell design, the anode headers, the cathode headers and the cooling fluid headers may include seal loops that extend completely around the header to increase the seal integrity. FIG. 23 is a cross-sectional view of a fuel cell stack 280 through a fuel cell 282, where like elements to the fuel cell stack 200 are identified by the same reference numeral, according to another embodiment of the present invention. In this fuel cell stack design, the seal 222 at the cathode inlet header 206 is replaced with a seal loop 286, the seal 224 at the cathode outlet header 208 is replaced with a seal loop 288, the seal 226 at the anode inlet header 210 is replaced with a seal loop 290, the seal 228 at the anode outlet header 212 is replaced with a seal loop 292, the seal 230 at the cooling fluid inlet header 214 is replaced with seal loops 294 and 296, and the seal 232 at the cooling fluid outlet header 216 is replaced with seal loops 298 and 300. As the motivation for the header loops is to avoid joints, such as shown by FIG. 20, which only appear at the corners of the reactant headers adjoining the active area, the coolant headers can be maintained without loops, as shown in FIG. 16.

Figure 24:
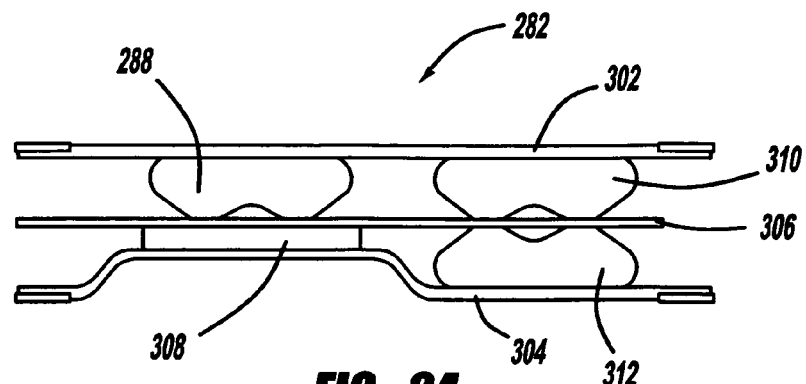
FIG. 24 is a cross-sectional view through line 24-24 of the fuel cell stack shown in FIG. 23.

The seal areas between the headers and the active area of the fuel cell stack 280 where the diffusion media layers 244 and 246 are extended to provide the seal integrity is the same as those areas in the fuel cell stack 200. However, the seal area at the outer edge of the headers where there is an extra seal would be different. To show this, FIG. 24 is a cross-sectional view through line 24-24 of the fuel cell stack 280. The fuel cell 282 includes an anode side bipolar plate 302, a cathode side bipolar plate 304 and a membrane 306 therebetween. Because the anode side diffusion media layer 308 would extend to the edge of the header 208, a cathode side diffusion media layer 308 is shown extending through the seal area provided by the seal loop 288 to provide the continuous seal integrity. In this embodiment, the outer seal loop 220 is made up of two seal halves 310 and 312 at this location.

Figure 25:
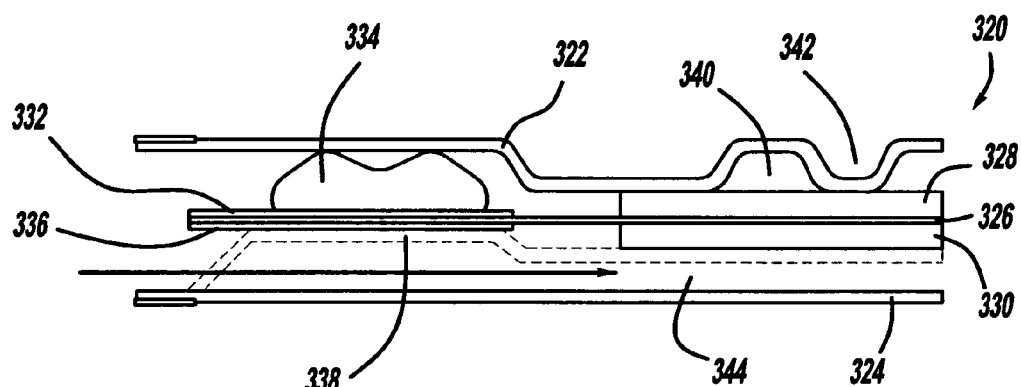
FIG. 25 is a cross-sectional view through line 17-17 of the fuel cell stack shown in FIG. 16, where the stack includes stamped bipolar plates and shims.
Figure 26:
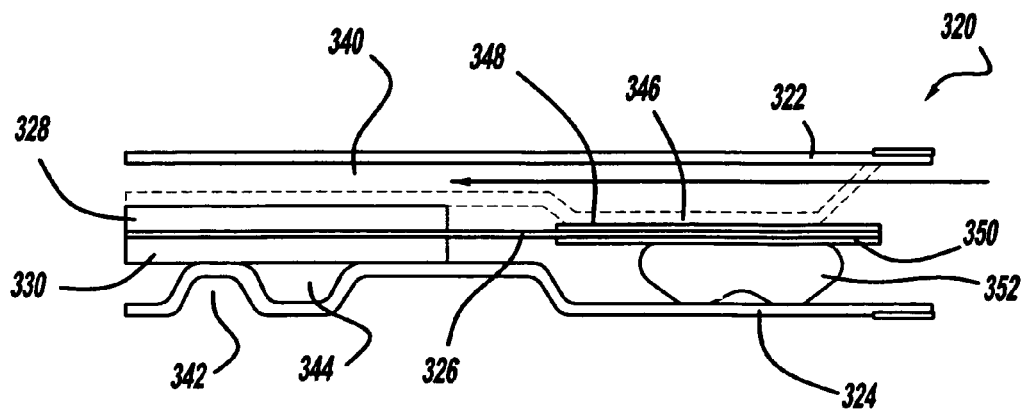
FIG. 26 is a cross-sectional view through line 18-18 of the fuel cell stack shown in FIG. 16, where the stack includes stamped bipolar plates and shims.
Figure 27:
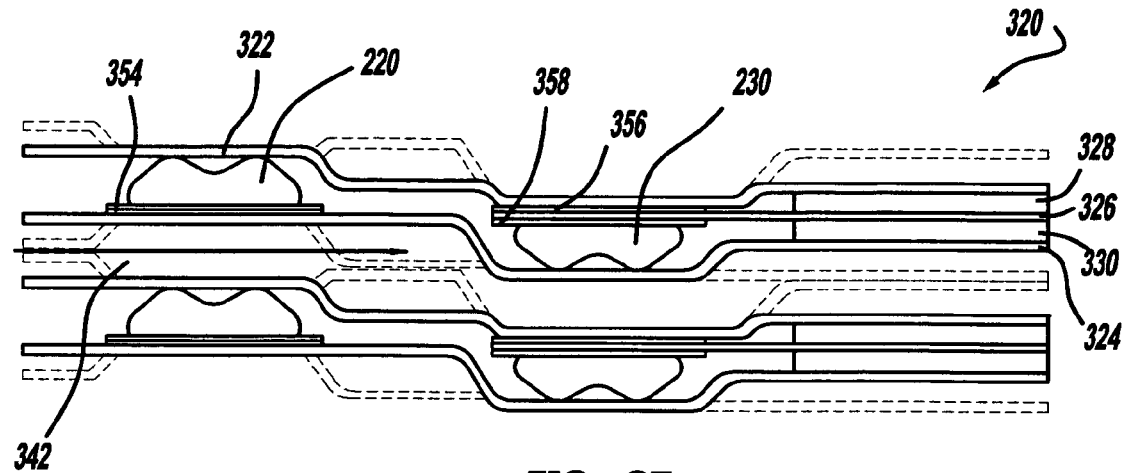
FIG. 27 is a cross-sectional view through line 19-19 of the fuel cell stack shown in FIG. 16, where the stack includes stamped bipolar plates and shims.
Figure 28:
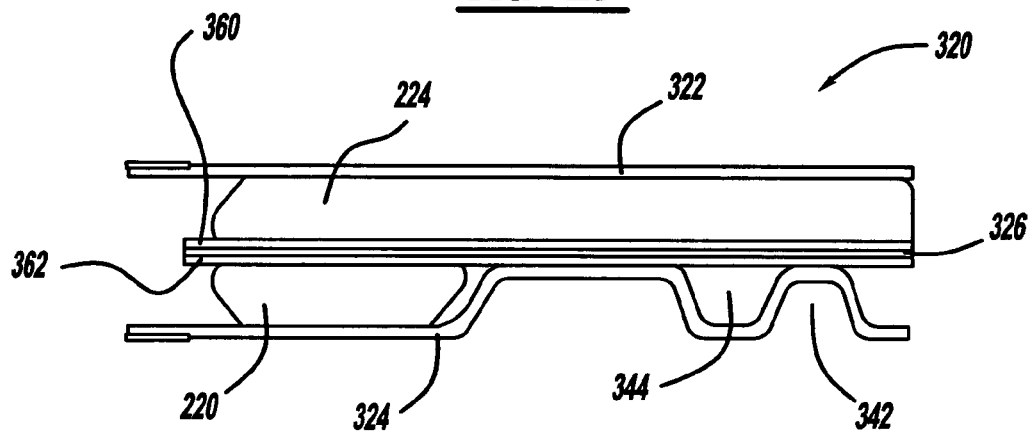
FIG. 28 is a cross-sectional view through line 20-20 of the fuel cell stack shown in FIG. 16, where the stack includes stamped bipolar plates and shims.
Figure 29:
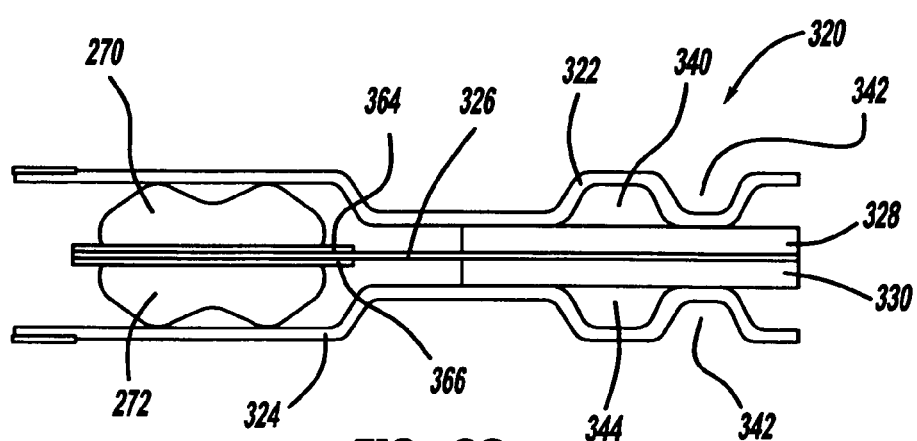
FIG. 29 is a cross-sectional view through line 21-21 of the fuel cell stack shown in FIG. 16, where the stack includes stamped bipolar plates and shims.

As discussed above, it is known in the art to provide shims between the seal and the membrane of the seal area, but it is not known to use shims across channels to create tunnels and support seal loads. FIGS. 25-30 show cross-sectional views through a fuel cell 320 of a fuel cell stack that would be similar to the fuel cell stack 200 where the various headers are provided at the same location of the fuel cell stack. Thus, FIG. 25 represents a cross-sectional view at location 17-17 of the fuel cell 320, FIG. 26 represents a cross-sectional view at location 18-18 of the fuel cell 320, FIG. 27 represents a cross-sectional view at location 19-19 of the fuel cell 320, FIG. 28 represents a cross-sectional view at location 20-20 of the fuel cell 320, FIG. 29 represents a cross-sectional view at location 21-21 of the fuel cell 320 and FIG. 30 represents a cross-sectional view at location 22-22 of the fuel cell 320.

The fuel cell 320 includes an anode side stamped bipolar plate 322, a cathode side stamped bipolar plate 324 and a membrane 326 therebetween. An anode side diffusion media layer 328 is provided between the bipolar plate 322 and the membrane 326 and a cathode side diffusion media layer 330 is provided between the membrane 326 and the bipolar plate 324. The anode side bipolar plate 322 defines anode side flow channels 340 and cooling fluid channels 342. In this embodiment, a shim 332 is provided between the membrane 326 and a seal 334 at the seal area and a shim 336 is provided between the membrane 326 and a raised portion 338 of the cathode side bipolar plate 324. Cathode flow channels 344 extend around the raised portion 338 and provide a straight flow through the seal area to the active area of the fuel cell 320. The combination of the shim 336 and the raised portion 338 maintain the seal integrity of the cathode side of the fuel cell 320 at this location.

FIG. 26 shows a seal area between the active area of the fuel cell 320 and the anode inlet header where the anode side bipolar plate 322 includes a raised portion 346. A shim 348 is provided between the raised portion 346 and the membrane 326 and a shim 350 is provided between the membrane 326 and a seal 352. The combination of the raised portion 346 and the shim 348 provides the structure to maintain the seal integrity at this area so that the anode flow channels 340 have a straight line flow through the seal area from the anode inlet header to the active area of the fuel cell 320.

FIG. 27 shows shims 354 between the seal 220 and the anode side bipolar plate 322, a shim 356 between the membrane 326 and the anode side bipolar plate 322 and a shim 358 between the membrane 326 and the seal 230.

FIG. 28 shows a shim 360 between the seal 224 and the membrane 326 and a shim 362 between the seal 220 and the membrane 326.

FIG. 29 shows a shim 364 between the seal 270 and the membrane 326 and a shim 366 between the membrane 326 and the seal 272.

FIG. 30 shows a shim 368 between the seal half 270 and the membrane 326, and a shim 370 between the membrane 326 and the seal half 272.

FIG. 31 is a cross-sectional view of a fuel cell stack 380 through a fuel cell 382. In this embodiment, the fuel cell stack 380 includes stamped bipolar plates, where the plates themselves provide the seal. The fuel cell stack 380 includes an active area 384, a cathode inlet header 386, a cathode outlet header 388, an anode inlet header 390, an anode outlet header 392, a cooling fluid inlet header 394 and a cooling fluid outlet header 396. A seal 398 extends around the perimeter of the fuel cell 382. A seal 400 is provided between the cathode inlet header 386 and the active area 384, a seal 402 is provided between the cathode outlet header 388 and the active area 384, a seal 404 is provided between the anode inlet header 390 and the active area 384, a seal 406 is provided between the anode outlet header 392 and the active area 384, a seal 408 is provided between the cooling fluid inlet header 394 and the active area 384 and a seal 410 is provided between the cooling fluid outlet header 396 and the active area 384. As mentioned above, all of the seals in this design are provided by the configuration of the bipolar plate.

FIG. 32 is a cross-sectional view through line 32-32 of the fuel cell 382. The fuel cell 382 includes an anode side stamped bipolar plate 420 and a cathode side stamped bipolar plate 422. The fuel cell 382 also includes an anode side diffusion media layer 424 and a cathode side diffusion media layer 426 with a membrane 428 therebetween. The anode side bipolar plate 420 includes anode flow channels 430 and half of cooling fluid flow channels 432, where the other half of the cooling fluid flow channels is provided by the other stamped plate half.

The seal 400 is defined by a section of the anode side bipolar plate 420. According to the invention, the cathode side diffusion media layer 426 is extended through the seal area opposite to the seal 400 to provide the seal integrity at this side of the membrane 428. Thus, cathode flow channels 434 can extend straight through the seal area from the cathode inlet header 386 to the active area 384 so that they do not have to jog around plate components that would act to collect water. The seal area between the cathode outlet header 388 and the active area 384 would look the same.

FIG. 33 is a cross-sectional view through line 33-33 of the fuel cell 382 showing the seal area between the anode inlet header 390 and the active area 384 of the fuel cell stack 380. According to the invention, the anode side diffusion media layer 424 is extended at this location to provide the seal integrity at the anode side of the fuel cell 382 opposite to the seal 404 provided by the structural configuration of the bipolar plate 422. The seal area between the anode outlet header 392 and the active area 384 would look the same.

FIG. 34 is a cross-sectional view through line 34-34 of the fuel cell stack 380 showing the seal area between the cooling fluid inlet header 394 and the active area 384. At this location of the fuel cell 382, the anode side bipolar plate 420 and the cathode side bipolar plate 422 provide the seals 408 and 398. The cooling fluid flow channels 432 extend through the plate in a straight flow through the seal area to the active area 384. Because the plates 420 and 422 provide the seals in this embodiment, this brings adjacent bipolar plates into electrical contact at certain locations in the fuel cell 382 and would create an electrical short. Therefore, a non-conductive separator 438 is provided at the seal location 408 to prevent electrical shorting. The seal area between the cooling fluid outlet header 396 and the active area 384 would look the same.

FIG. 35 is a cross-sectional view through line 35-35 at a joint sealing area between the cathode outlet header 388 and the active area 384. The cathode side diffusion media layer 426 is extended at this location for the anode side bipolar plate 420 and the cathode side bipolar plate 422 define the seals 402 and 398. A gap 440 between the diffusion media layer 426 and the seal portion of the plate 422 may need to be filled with a suitable material.

FIG. 36 is a cross-sectional view at an edge section of the fuel cell 382, and would be similar to the edge section of the known fuel cell stacks that include stamped bipolar plates with stamped seals.

Figure 37:
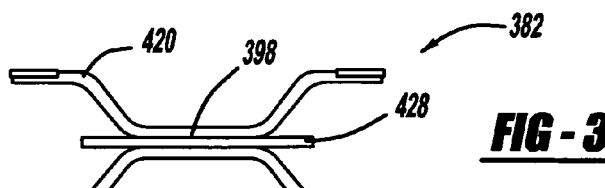
FIG. 37 is a cross-sectional view through line 37-37 of the fuel cell stack shown in FIG. 31.

FIG. 37 is a cross-sectional view through line 37-37 of the fuel cell stack 380 at an outer edge of the cathode outlet header 388. At this location, the seal 398 is provided by the anode side bipolar plate 420 and the cathode side bipolar plate 422.

Figure 38:
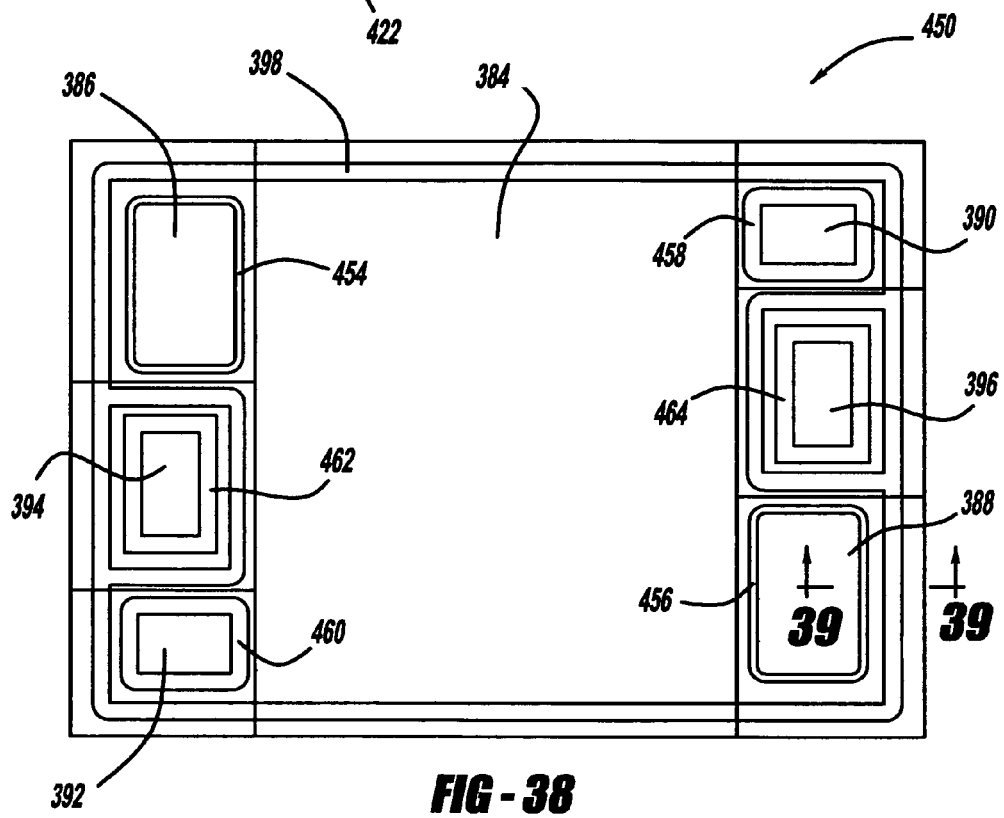
FIG. 38 is a cross-sectional view of a fuel cell stack including stamped bipolar plates and header seal loops, where the bipolar plates provide the seal for the stack, according to another embodiment of the present invention.

For certain fuel cell designs, as discussed above, the anode headers, the cathode headers and the cooling fluid headers include seal loops that extend completely around the header to increase the seal integrity. FIG. 38 is a cross-sectional view of a fuel cell stack 450 through a fuel cell 452, where like elements to the fuel cell stack 380 are identified by the same reference numeral. In this fuel cell stack design, the seal 400 at the cathode inlet header 386 is replaced with a seal loop 454, the seal 402 at the cathode outlet header 388 is replaced with a seal loop 456, the seal 404 at the anode inlet header 390 is replaced with a seal loop 458, the seal 406 at the anode outlet header 392 is replaced with a seal loop 460, the seal 408 at the cooling fluid inlet header 394 is replaced with a seal loop 462 and the seal 410 at the cooling fluid outlet header 396 is replaced with a seal loop 464. As the motivation for the header loops is to avoid joints, such as shown by FIG. 35, which only appear at the corners of the reactant headers adjoining the active area, the coolant headers can be maintained without loops, as shown in FIG. 31.

Figure 39:
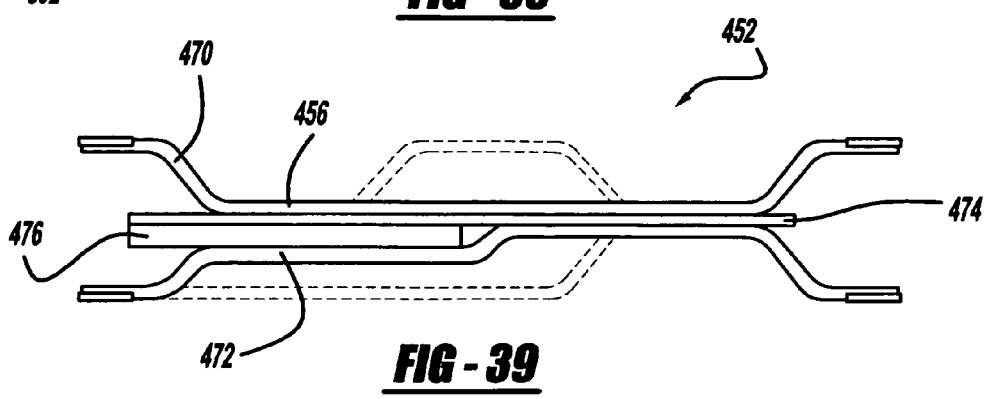
FIG. 39 is a cross-sectional view through line 39-39 of the fuel cell stack shown in FIG. 38.

The seal area between the cathode headers 386 and 388 and the active area 384, between the anode headers 390 and 392 and the active area 384 and between the cooling fluid headers 394 and 396 and the active area 384 is the same as those seal areas in the fuel cell stack 380. However, the seal area at the outer edge of the headers 386, 388, 390, 392, 394 and 396 where there is an extra seal would be different. To show this, FIG. 39 is a cross-sectional view through line 39-39 of the fuel cell stack 450, according to another embodiment of the present invention. The fuel cell 452 includes an anode side bipolar plate 470, a cathode side bipolar plate 472 and a membrane 474 therebetween. Because the cathode side diffusion media layer 476 would extend to the edge of the header 388, the diffusion media layer 476 is shown extending through the seal area provided by the seal loop 456 to provide the continuous seal integrity.

Figure 40:
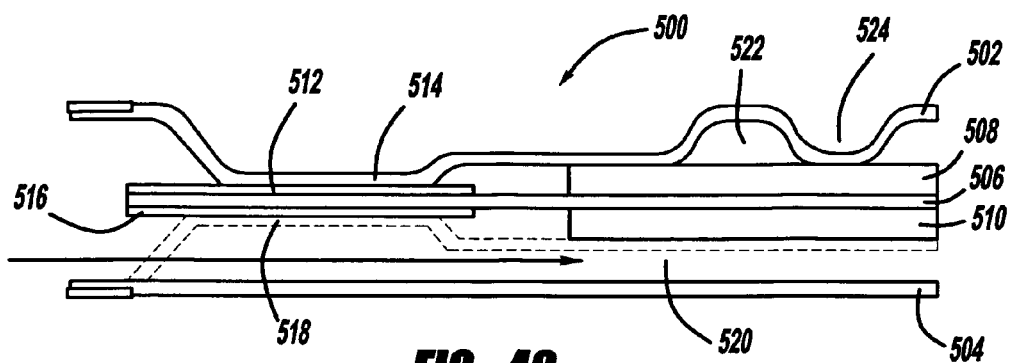
FIG. 40 is a cross-sectional view through line 32-32 of the fuel cell stack shown in FIG. 31, where the stack includes stamped bipolar plates and shims, and where the bipolar plates provide the seal for the stack.
Figure 41:
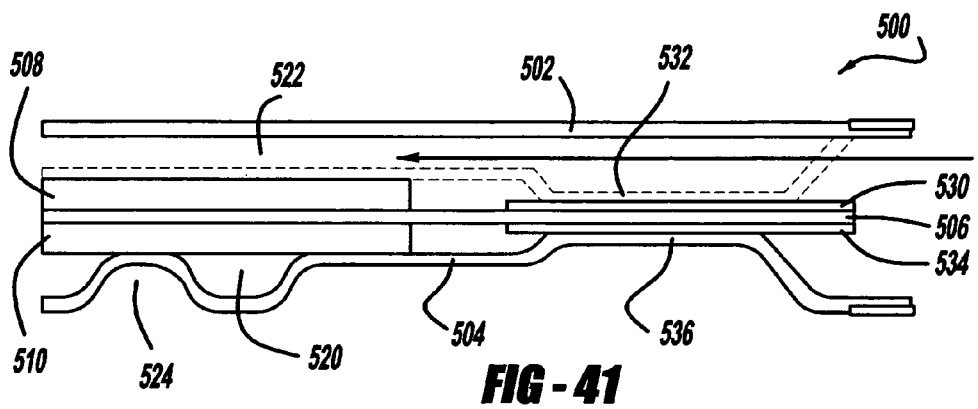
FIG. 41 is a cross-sectional view through line 33-33 of the fuel cell stack shown in FIG. 31, where the stack includes stamped bipolar plates and shims, and where the bipolar plates provide the seal for the stack.
Figure 42:
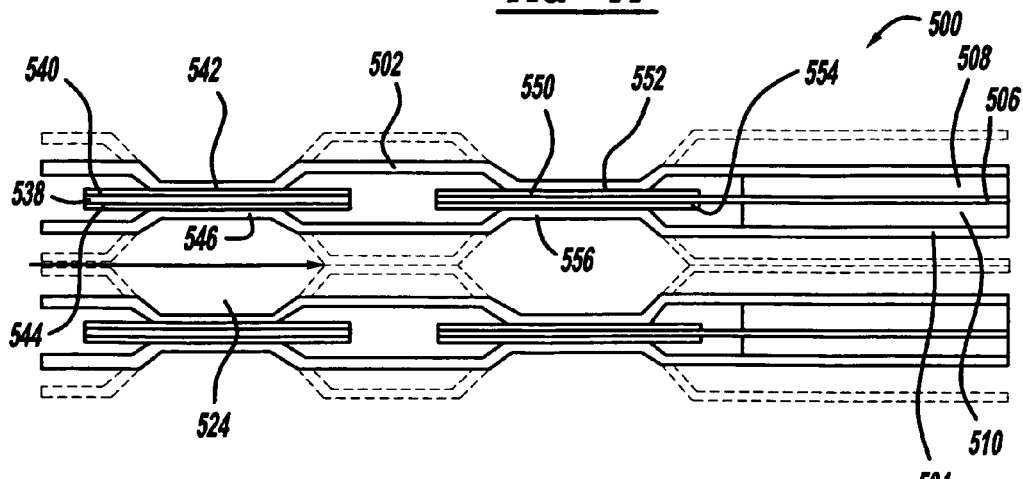
FIG. 42 is a cross-sectional view through line 34-34 of the fuel cell stack shown in FIG. 31, where the stack includes stamped bipolar plates and shims, and where the bipolar plates provide the seal for the stack.
Figure 43:
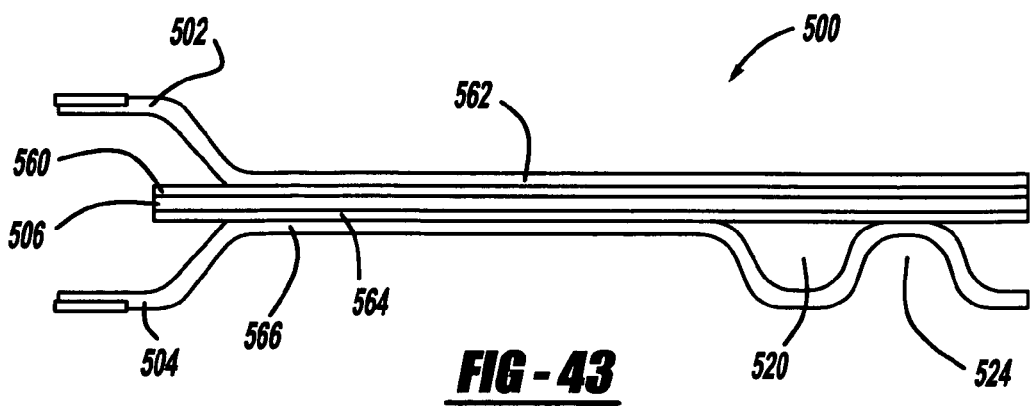
FIG. 43 is a cross-sectional view through line 35-35 of the fuel cell stack shown in FIG. 31, where the stack includes stamped bipolar plates and shims, and where the bipolar plates provide the seal for the stack.
Figure 44:
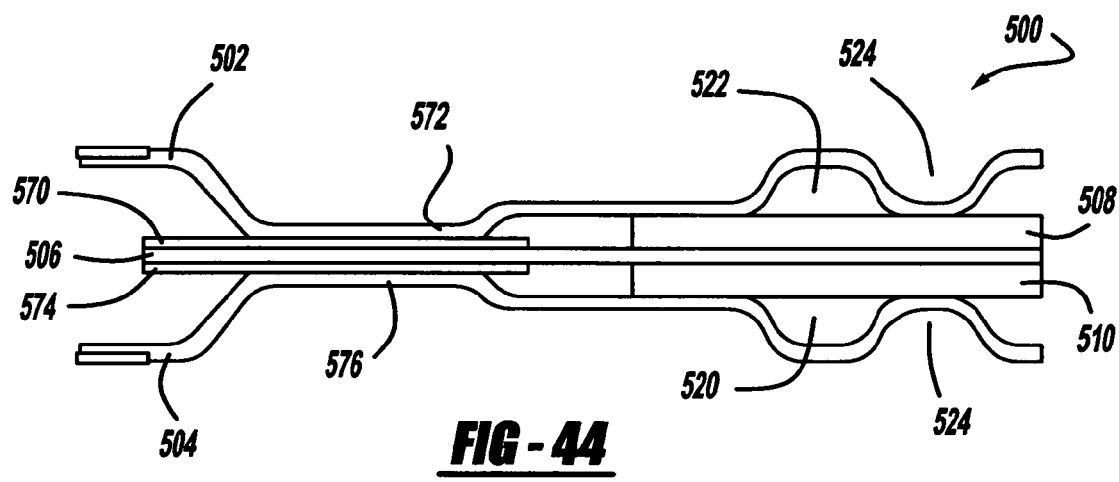
FIG. 44 is a cross-sectional view through line 36-36 of the fuel cell stack shown in FIG. 31, where the stack includes stamped bipolar plates and shims, and where the bipolar plates provide the seal for the stack.
Figure 45:
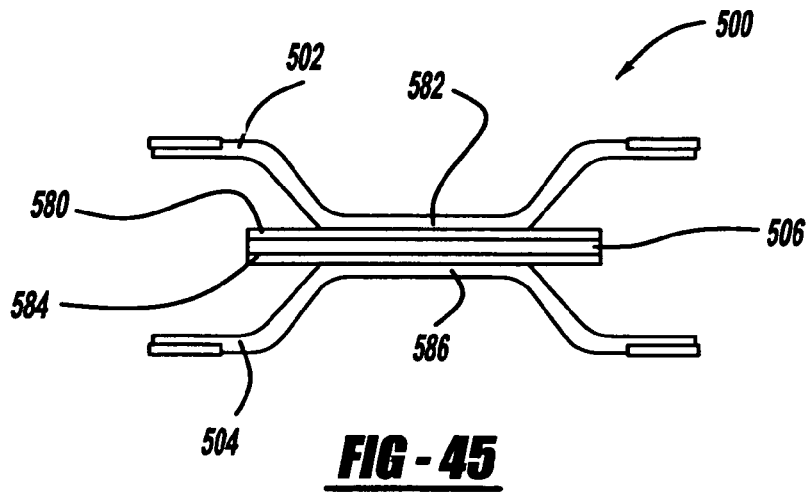
FIG. 45 is a cross-sectional view through line 37-37 of the fuel cell stack shown in FIG. 31, where the stack includes stamped bipolar plates and shims, and where the bipolar plates provide the seal for the stack.

As discussed above, it is known in the art to provide shims between the seal and the membrane seal area. FIGS. 40-45 show cross-sectional views through a fuel cell 500 that would be similar to the fuel cell 382 where the various headers are provided at the same location of the fuel cell stack 380. FIG. 40 represents a cross-sectional view at location 32-32 of the fuel cell 500, FIG. 41 represents a cross-sectional view at location 33-33 of the fuel cell 500, FIG. 42 represents a cross-sectional view at location 34-34 of the fuel cell 500, FIG. 43 represents a cross-sectional view at location 35-35 of the fuel cell 500, FIG. 44 represents a cross-sectional view at location 36-36 of the fuel cell 500 and FIG. 45 represents a cross-sectional view of the fuel cell 500 at location 37-37.

FIG. 40 shows the seal area between the active area 384 of the fuel cell 500 and the cathode inlet header 386. The fuel cell 500 includes an anode side bipolar plate 502, a cathode side bipolar plate 504 and a membrane 506 therebetween. An anode side diffusion media layer 508 is provided between the bipolar plate 502 and the membrane 506 and a cathode side diffusion media layer 510 is provided between the membrane 506 and the bipolar plate 504. The anode side bipolar plate 502 defines anode flow channels 522 and cooling fluid flow channels 524. In this embodiment, a shim 512 is provided between the membrane 506 and a seal section 514 of the plate 502 and a shim 516 is provided between the membrane 506 and a seal section 518. Cathode flow channels 520 extend through the seal area and provide a straight flow to the active area of the fuel cell 500.

FIG. 41 shows the seal area between the active area 384 of the fuel cell 500 and the anode inlet header 390. A shim 530 is provided between a seal section 532 of the plate 502 and the membrane 506, and a shim 534 is provided between a seal section 536 of the plate 504 and the membrane 506.

FIG. 42 shows the seal area between the active area of the fuel cell 500 and the cooling fluid inlet header 394. A shim 540 is provided between a seal section 542 of the bipolar plate 502 and a separator 538, and a shim 544 is provided between a seal section 546 of the cathode side bipolar plate 504 and the separator 538. Likewise, a shim 550 is provided between a seal portion 552 of the plate 502 and the membrane 506, and a shim 554 is provided between a seal section 556 and the membrane 506. The cooling fluid flow channels 524 extend through the plates 502 and 504 in a straight flow though the seal area to the active area.

FIG. 43 shows a shim 560 between a seal portion 562 of the anode side bipolar plate 502 and the membrane 506 and a shim 564 between a seal section 566 of the plate 504 of the cathode side bipolar plate 504 and the membrane 506.

FIG. 44 shows a shim 570 between a seal section 572 of the anode side bipolar plate 502 and a shim 574 between a seal section 576 of the cathode side bipolar plate 504 and the membrane 506.

FIG. 45 shows a shim 580 positioned between a seal section 582 of the anode side bipolar plate 502 and the membrane 506, and a shim 584 positioned between a seal section 586 of the cathode side bipolar plate 504 and the membrane 506.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell stack including a plurality of stacked fuel cells, each fuel cell including an active area, said fuel cell stack comprising:
   a plurality of membranes where each fuel cell in the stack includes a membrane;
   a plurality of diffusion media layers where each fuel cell includes an anode side diffusion media layer at an anode side of the fuel cell and a cathode side diffusion media layer at a cathode side of the fuel cell;
   a plurality of bipolar plates positioned between the fuel cells in the stack adjacent to the diffusion media layers, said bipolar plates including anode flow channels facing the anode side diffusion media layer in the fuel cells, cathode flow channels facing the cathode side diffusion media layer in the fuel cells and cooling fluid flow channels;
   an anode inlet header directing an anode reactant gas flow to the anode flow channels;
   an anode outlet header receiving the anode reactant gas flow from the anode flow channels;
   a cathode inlet header directing a cathode reactant gas flow to the cathode flow channels;
   a cathode outlet header receiving the cathode reactant gas flow from the cathode flow channels;
   a cooling fluid inlet header directing a cooling fluid to the cooling fluid flow channels;
   a cooling fluid outlet header receiving the cooling fluid from the cooling fluid flow channels; and
   a configuration of seals for containing the reactant gas flow and the cooling fluid flow in the stack, said configuration of seals including a cathode header seal provided between the cathode outlet header and the active area of each fuel cell, wherein the cathode flow channels are straight flow channels between the cathode outlet header and the active area, said configuration of seals further including an anode header seal provided between the anode outlet header and the active area of each fuel cell, wherein the anode flow channels are straight flow channels between the anode outlet header and the active area, said cathode side diffusion media layer in each fuel cell extends through the seal area between the cathode outlet header and the active area, and the anode side diffusion media layer in each fuel cell extends through the seal area between the anode outlet header and the active area.

2. The fuel cell stack according to claim 1 wherein the configuration of seals includes two separate seals between the cooling fluid inlet header and the active area in each fuel cell, wherein the cooling fluid flow channels are straight flow channels through the seal area between the cooling fluid inlet header and the active area.

3. The fuel cell stack according to claim 1 wherein the configuration of seals includes a single piece seal having a perimeter seal extending around each fuel cell, a seal segment between the anode inlet header and the active area, a seal segment between the anode outlet header and the active area, a seal segment between the cathode inlet header and the active area and a seal segment between the cathode outlet header and the active area.

4. The fuel cell stack according to claim 1 wherein the configuration of seals includes a perimeter seal extending around each fuel cell, a first seal loop extending around the anode inlet header in each fuel cell, a second seal loop extending around the anode outlet header in each fuel cell, a third seal loop extending around the cathode inlet header in each fuel cell, and a fourth seal loop extending around the cathode outlet header in each fuel cell.

5. The fuel cell stack according to claim 4 wherein the configuration of seals further includes a fifth seal loop extending around the cooling fluid inlet header in each fuel cell and a sixth seal loop extending around the cooling fluid outlet header in each fuel cell.

6. The fuel cell stack according to claim 1 wherein the plurality of bipolar plates are composite bipolar plates.

7. The fuel cell stack according to claim 1 wherein the plurality of bipolar plates are stamped bipolar plates.

8. The fuel cell stack according to claim 7 wherein sections of the stamped bipolar plates provide the configuration of seals.

9. The fuel cell stack according to claim 1 further comprising shims positioned between the seals and the membrane at the seal locations in the fuel cells so as to provide seal support.

10. The fuel cell stack according to claim 9 wherein the shims are part of a fuel cell sub-gasket.

11. The fuel cell stack according to claim 9 wherein the shims in each fuel cell combine to be a single piece shim.

12. The fuel cell stack according to claim 1 wherein the membrane in each fuel cell extends straight through the seal area provided by the configuration of seals.

13. The fuel cell stack according to claim 1 wherein the stack is part of a fuel cell system on a vehicle.

14. A fuel cell stack including a plurality of stacked fuel cells, each fuel cell including an active area, said fuel cell stack comprising a configuration of seals, said configuration of seals including cathode inlet header seals provided between a cathode inlet header and an active area of each fuel cell, wherein cathode flow channels are straight flow channels between the cathode inlet header and the active area and wherein a cathode side diffusion media layer in each fuel cell extends through the seal area between the cathode inlet header and the active area, said configuration of seals further including cathode outlet header seals provided between a cathode outlet header and the active area of each fuel cell, wherein the cathode flow channels are straight flow channels between the cathode outlet header and the active area and wherein the cathode side diffusion media layer in each fuel cell extends through the seal area between the cathode outlet header and the active area, said configuration of seals further including anode inlet header seals provided between the anode inlet header and the active area of each fuel cell, wherein anode flow channels are straight flow channels between the anode inlet header and the active area and wherein an anode side diffusion media layer in each fuel cell extends through the seal area between the anode inlet header and the active area, said configuration of seals further including anode outlet header seals provided between an anode outlet header and the active area of each fuel cell, wherein the anode flow channels are straight flow channels between the anode outlet header and the active area and wherein the anode side diffusion media layer in each fuel cell extends through the seal area between the anode outlet header and the active area.

15. The fuel cell stack according to claim 14 wherein the configuration of seals includes a single piece seal having a perimeter seal extending around each fuel cell, a seal segment between the anode inlet header and the active area, a seal segment between the anode outlet header and the active area, a seal segment between the cathode inlet header and the active area and a seal segment between the cathode outlet header and the active area.

16. The fuel cell stack according to claim 14 wherein the configuration of seals includes a perimeter seal extending around each fuel cell, a first seal loop extending around the anode inlet header in each fuel cell, a second seal loop extending around the anode outlet header in each fuel cell, a third seal loop extending around the cathode inlet header in each fuel cell, and a fourth seal loop extending around the cathode outlet header in each fuel cell.

17. A fuel cell stack including a plurality of stacked fuel cells, each fuel cell including an active area, said fuel cell stack comprising:
   a plurality of membranes where each fuel cell in the stack includes a membrane;
   a plurality of diffusion media layers where each fuel cell includes an anode side diffusion media layer at an anode side of the fuel cell and a cathode side diffusion media layer at a cathode side of the fuel cell;
   a plurality of bipolar plates positioned between the fuel cells in the stack adjacent to the diffusion media layers, said bipolar plates including anode flow channels facing the anode side diffusion media layer in the fuel cells, cathode flow channels facing the cathode side diffusion media layer in the fuel cells and cooling fluid flow channels;
   an anode inlet header directing an anode reactant gas flow to the anode flow channels;
   an anode outlet header receiving the anode reactant gas flow from the anode flow channels;
   a cathode inlet header directing a cathode reactant gas flow to the cathode flow channels;
   a cathode outlet header receiving the cathode reactant gas flow from the cathode flow channels;
   a cooling fluid inlet header directing a cooling fluid to the cooling fluid flow channels;
   a cooling fluid outlet header receiving the cooling fluid from the cooling fluid flow channels; and
   a configuration of seals for containing the reactant gas flow and the cooling fluid flow in the stack, wherein the membrane in each fuel cell extends straight through the seal area provided by the configuration of seals, said configuration of seals including cathode inlet header seals provided between the cathode inlet header and the active area of each fuel cell, wherein the cathode flow channels are straight flow channels between the cathode inlet header and the active area and wherein the cathode side diffusion media layer in each fuel cell extends through the seal area between the cathode inlet header and the active area, said configuration of seals further including cathode outlet header seals provided between the cathode outlet header and the active area of each fuel cell, wherein the cathode flow channels are straight flow channels between the cathode outlet header and the active area and wherein the cathode side diffusion media layer in each fuel cell extends through the seal area between the cathode outlet header and the active area, said configuration of seals further including anode inlet header seals provided between the anode inlet header and the active area of each fuel cell, wherein the anode flow channels are straight flow channels between the anode inlet header and the active area and wherein the anode side diffusion media layer in each fuel cell extends through the seal area between the anode inlet header and the active area, said configuration of seals further including anode outlet header seals provided between the anode outlet header and the active area of each fuel cell, wherein the anode flow channels are straight flow channels between the anode outlet header and the active area and wherein the anode side diffusion media layer in each fuel cell extends through the seal area between the anode outlet header and the active area.

18. The fuel cell stack according to claim 17 wherein the configuration of seals further including two separate seals between the cooling fluid inlet header and the active area in each fuel cell, wherein the cooling fluid flow channels are straight flow channels through the seal area between the cooling fluid inlet header and the active area, said configuration of seals further including two separate seals between the cooling fluid outlet header and the active area in each fuel cell, wherein the cooling fluid flow channels are straight flow channels through the seal area between the cooling fluid outlet header and the active area.

19. The fuel cell stack according to claim 17 wherein the configuration of seals includes a single piece seal having a perimeter seal extending around each fuel cell, a seal segment between the anode inlet header and the active area, a seal segment between the anode outlet header and the active area, a seal segment between the cathode inlet header and the active area and a seal segment between the cathode outlet header and the active area.

20. The fuel cell stack according to claim 17 wherein the configuration of seals includes a perimeter seal extending around each fuel cell, a first seal loop extending around the anode inlet header in each fuel cell, a second seal loop extending around the anode outlet header in each fuel cell, a third seal loop extending around the cathode inlet header in each fuel cell, a fourth seal loop extending around the cathode outlet header in each fuel cell, a fifth seal loop extending around the cooling fluid inlet header in each fuel cell, and a sixth seal loop extending around the cooling fluid outlet header in each fuel cell.

21. The fuel cell stack according to claim 17 wherein the plurality of bipolar plates are composite bipolar plates.

22. The fuel cell stack according to claim 17 wherein the plurality of bipolar plates are stamped bipolar plates.

23. The fuel cell stack according to claim 22 wherein sections of the stamped bipolar plates provide the configuration of seals.

24. A fuel cell stack including a plurality of stacked fuel cells, each fuel cell including an active area, said fuel cell stack comprising a configuration of seals, said configuration of seals including cathode inlet header seals provided between a cathode inlet header and an active area of each fuel cell, wherein cathode flow channels are straight flow channels between the cathode inlet header and the active area and wherein a shim provides seal support at the seal area between the cathode inlet header and the active area, said configuration of seals further including cathode outlet header seals provided between a cathode outlet header and the active area of each fuel cell, wherein the cathode flow channels are straight flow channels between the cathode outlet header and the active area and wherein a shim provides seal support at the seal area between the cathode outlet header and the active area, said configuration of seals further including anode inlet header seals provided between the anode inlet header and the active area of each fuel cell, wherein anode flow channels are straight flow channels between the anode inlet header and the active area and wherein a shim that is part of a fuel cell sub-gasket provides seal support at the seal area between the anode inlet header and the active area, said configuration of seals further including anode outlet header seals provided between an anode outlet header and the active area of each fuel cell, wherein the anode flow channels are straight flow channels between the anode outlet header and the active area and wherein a shim that is part of a fuel cell sub-gasket provides seal support at the seal area between the anode outlet header and the active area, wherein the shims in each fuel cell combine to be a single piece shim.

* * * * *